United States Patent
Niemiec

(10) Patent No.: US 10,315,752 B2
(45) Date of Patent: Jun. 11, 2019

(54) METHODS AND APPARATUS TO VALIDATE AN AIRCRAFT CONTROL SYSTEM COMMAND

(71) Applicant: The Boeing Company, Chicago, IL (US)

(72) Inventor: Aaron Niemiec, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/383,893

(22) Filed: Dec. 19, 2016

(65) Prior Publication Data

US 2018/0170518 A1    Jun. 21, 2018

(51) Int. Cl.
G06F 19/00     (2018.01)
B64C 3/56     (2006.01)

(52) U.S. Cl.
CPC ............. *B64C 3/56* (2013.01); *Y02T 50/14* (2013.01)

(58) Field of Classification Search
CPC .......... B64C 3/56; B64C 19/00; B64C 13/04; B64C 23/065
USPC .......... 701/120; 244/49, 102, 124; 280/414; 92/14
See application file for complete search history.

(56) References Cited

U.S. PATENT DOCUMENTS

| | | | | |
|---|---|---|---|---|
| 3,081,053 A | * | 3/1963 | Jarrell | B64C 3/56 16/352 |
| 5,381,986 A | * | 1/1995 | Smith | B64C 3/56 244/49 |
| 5,427,329 A | * | 6/1995 | Renzelmann | B64C 3/56 244/49 |
| 5,492,288 A | * | 2/1996 | Bordelon | A63H 27/08 244/153 R |
| 6,260,799 B1 | * | 7/2001 | Russ | B64C 3/56 244/49 |
| 9,290,260 B2 | * | 3/2016 | Lassen | B64C 3/56 |
| 9,296,469 B2 | | 3/2016 | Santini et al. | |
| 9,296,472 B2 | | 3/2016 | Thoreen et al. | |
| 9,415,857 B2 | | 8/2016 | Fox et al. | |
| 2007/0057120 A1 | * | 3/2007 | McConnell | B60P 1/52 244/118.1 |
| 2014/0014768 A1 | * | 1/2014 | Lassen | B64C 3/56 244/49 |
| 2015/0014478 A1 | * | 1/2015 | Lassen | B64C 3/56 244/49 |

(Continued)

OTHER PUBLICATIONS

United States Patent and Trademark Office, "Non-Final Office Action," issued in connection with U.S. Appl. No. 15/383,873, dated May 29, 2018, 17 pages.

*Primary Examiner* — Shardul D Patel
(74) *Attorney, Agent, or Firm* — Hanley, Flight & Zimmerman, LLC

(57) ABSTRACT

Methods, apparatus, and articles of manufacture to validate an aircraft control system command are disclosed. An example apparatus disclosed herein includes a detection module to determine a status of a component of a folding wingtip assembly operatively coupled to a wing of an aircraft and determine a flight stage of the aircraft. The example apparatus further includes a sequence and control module to generate a command to control a movement of the folding wingtip assembly, and a gatekeeper module to validate the command based on the status and the flight stage.

20 Claims, 14 Drawing Sheets

(56) References Cited

U.S. PATENT DOCUMENTS

2015/0108283 A1* 4/2015 Thoreen ............... B64C 13/04
                                                    244/234
2017/0152015 A1   6/2017 Wilson et al.

* cited by examiner ically,
METHODS AND APPARATUS TO VALIDATE AN AIRCRAFT CONTROL SYSTEM COMMAND

RELATED APPLICATIONS

This patent includes subject matter related to U.S. Pat. No. 9,290,260, which was filed on Sep. 10, 2013, U.S. Pat. No. 9,296,469, which was filed on Aug. 10, 2013, and U.S. Pat. No. 9,296,472, which was filed on Oct. 17, 2013, all of which are hereby incorporated by reference in their entireties.

FIELD OF THE DISCLOSURE

This disclosure relates generally to aircraft and, more particularly, to methods and apparatus to validate an aircraft control system command.

BACKGROUND

In recent years, commercial aircraft manufacturers have been increasingly focused on designing and developing more fuel-efficient aircraft. An increase in fuel-efficiency produces cost savings over the lifetime of aircraft as fuel prices continue to trend higher. The fuel efficiency of an aircraft is typically a function of aerodynamic drag and fuel burn. The aerodynamic drag and the fuel burn of the aircraft may be reduced as an aspect ratio of the aircraft wings is increased. In aeronautics, a long, narrow wing has a high aspect ratio in comparison to a short, wide wing, which has a low aspect ratio. Thus, increasing a wingspan of an aircraft is an efficient method of increasing the aspect ratio.

Increasing the wingspan of an aircraft may reduce the aerodynamic drag and the fuel burn of the aircraft. However, increasing the wingspan of the aircraft to lengths that are beyond the wingspans of current aircraft may produce difficulties for conventional airports with limited gate and taxiway spacing. Many airports can accommodate aircraft that have a wingspan up to a conventional maximum length. By increasing the wingspan beyond the conventional maximum length, the aerodynamic drag and the fuel burn of the aircraft may be reduced at the expense of being able to land and/or maneuver at airports.

SUMMARY

An example apparatus disclosed herein includes a detection module to determine a status of a component of a folding wingtip assembly operatively coupled to a wing of an aircraft and determine a flight stage of the aircraft. The example apparatus further includes a sequence and control module to generate a command to control a movement of the folding wingtip assembly, and a gatekeeper module to validate the command based on the status and the flight stage.

An example method disclosed herein includes determining a status of a component of a folding wingtip assembly operatively coupled to a wing of an aircraft, determining a flight stage of the aircraft, generating a command to control a movement of the folding wingtip assembly, and validating the command based on the status and the flight stage.

An example tangible computer-readable storage medium includes instructions, which when executed, cause a machine to at least determine a status of a component of a folding wingtip assembly operatively coupled to a wing of an aircraft, determine a flight stage of the aircraft, generate a command to control a movement of the folding wingtip assembly, and validate the command based on the status and the flight stage.

Figure 1:
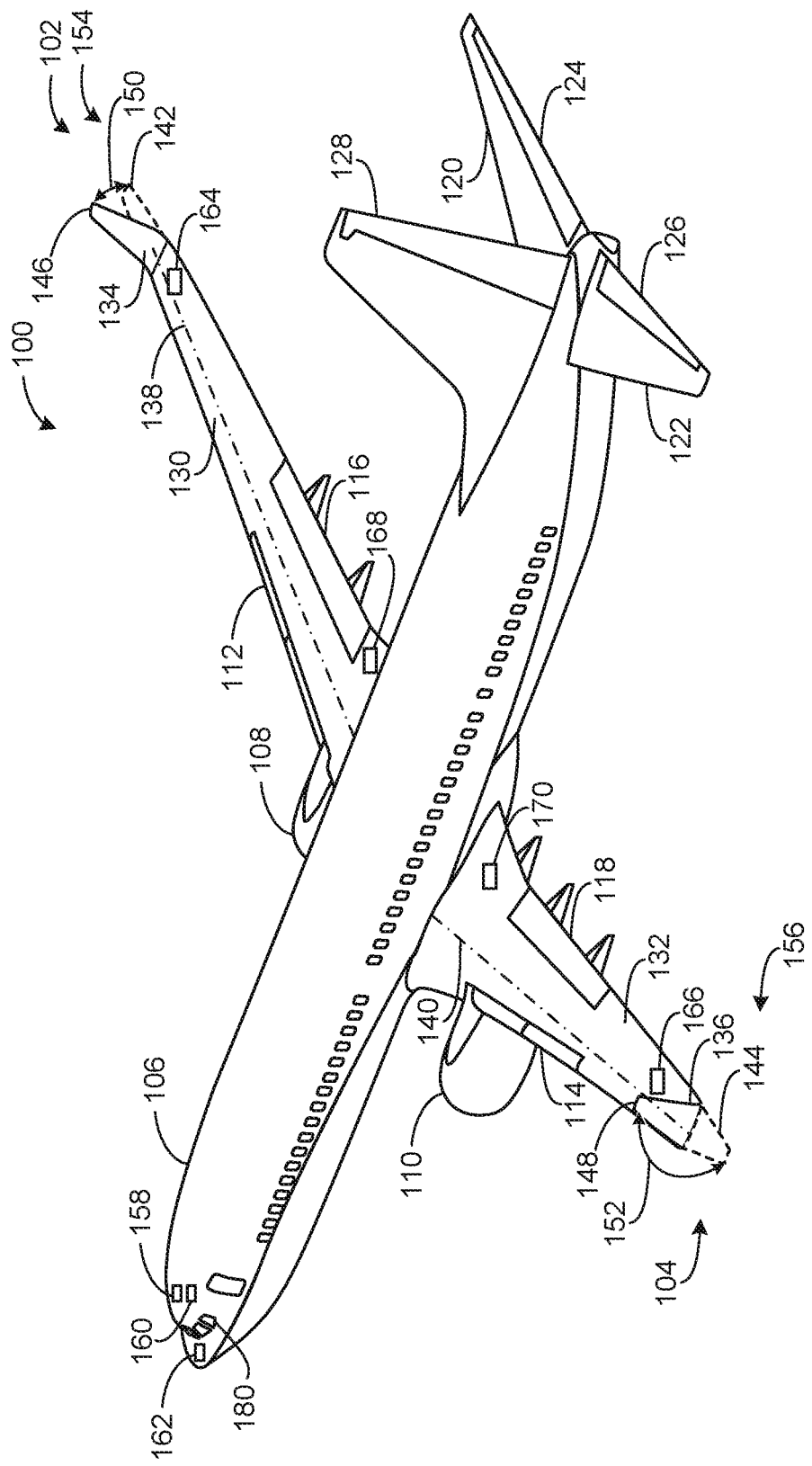
FIG. 1 is a schematic illustration of an aircraft with a folding wingtip assembly coupled to both wings of the aircraft.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

In recent years, commercial aircraft manufacturers have invested in aircraft designs to improve profitability for commercial airline operators. Economics governing the modern air transportation industry have influenced designs toward larger and/or more fuel-efficient aircraft. Larger aircraft can carry a greater number of passengers, thereby enabling an overall cost of each flight to be spread across the greater number of passengers. Larger aircraft are also able to carry additional fuel that may be used to deploy the aircraft on longer, more expensive flight routes.

Larger aircraft may burn additional fuel over a given travel distance due to the increased weight of these aircraft. To counteract the increased weight, one or more aircraft flight control surfaces (e.g., an elevator, a flap, a horizontal stabilizer, a rudder, a slat, a vertical stabilizer, a wing, etc.) may be added to the aircraft to reduce drag and/or enhance lift. In some examples, the one or more aircraft flight control surfaces are controlled in flight to improve aerodynamic properties of the aircraft. In some instances, the one or more aircraft flight control surfaces may be aerodynamically designed to reduce drag and enhance lift of the aircraft.

Aircraft wings, for example, may be designed to reduce drag by manipulating an aspect ratio of the wings. In aeronautics, the aspect ratio of the aircraft wings is the ratio of the span of the wings to the mean chord of the wings. The span is the distance from one wingtip to the other wingtip. The span is measured in a straight line from wingtip to wingtip, independently of wing shape or sweep. A chord is an imaginary straight line joining a leading edge and a trailing edge of the aircraft wing. A chord length is a distance between the trailing edge and the point on the leading edge where the chord intersects the leading edge. Most aircraft wings are not rectangular so they have a different chord and corresponding chord length at different positions along the span of the aircraft wing. In some examples, the mean chord is a standard mean chord (SMC), where the SMC is defined as wing area divided by wing span. In some instances, the mean chord is a mean aerodynamic chord (MAC), where the MAC is calculated using an integral sum of the chord lengths over the wingspan of the aircraft.

To increase the aspect ratio of aircraft wings, the wingspan may be increased, the mean chord may be decreased, and/or a combination thereof. Increasing the wingspan is an effective method of increasing the aspect ratio of aircraft wings and reducing drag and/or enhancing lift of the aircraft. However, elongated wingspans may pose challenges to existing airport layouts. For example, an aircraft with an increased or elongated wingspan may not fit in an allocated space at a gate of an airport terminal. Such aircraft wings may interfere with other aircraft and/or gates when attempting to dock at a designated gate of the aircraft terminal.

Example folding wingtip (FWT) apparatus disclosed herein are operative to fold wingtips of an aircraft that has an elongated wingspan. The example FWT apparatus may be used to move the wingtips of an aircraft from an extended position (e.g., a flight position, an unfolded position, etc.) to a folded position. For example, the extended position may be a position where the wingtips of the aircraft are flush with a curvature of the wings of the aircraft. The folded position may be a position where the wingtips of the aircraft are at an angle with respect to a horizontal axis of the wings of the aircraft. Alternatively, the example FWT apparatus may be used to move the wingtips of the aircraft to an intermediate position between the extended position and the folded position. The example FWT apparatus may include actuators, motors, and sensors to extend and fold the wingtips of the aircraft. The actuators and the motors may be electrically, hydraulically, and/or pneumatically actuated. The sensors may monitor component information such as, for example, a flow rate (e.g., a flow rate of hydraulic fluid), a pressure (e.g., an air pressure, a hydraulic pressure, etc.), a temperature (e.g., a temperature of hydraulic fluid), etc. The sensors may also monitor component status information such as, for example, a position of a component (e.g., a position of a linear actuator, a position of a locking mechanism, etc.), a status of a motor (e.g., a speed of a motor is greater than zero revolutions per minute), etc.

Some disclosed example FWT apparatus disclosed herein are operative to fold wingtips of the aircraft based on a latch and lock system. The example FWT apparatus may include a plurality of latch pins that are locked into a latch position by primary locks and secondary locks. Each primary lock mechanically blocks movement of a corresponding secondary lock to hold the secondary lock in a locked position when the primary lock is not in a locked position. The secondary locks are coupled together to cause the secondary locks to move together into and out from locked positions. A latch pin inhibitor blocks movement of the latch pin into the latch position. The latch pin inhibitor is moved to permit latching after completing a folding or unfolding of the wingtip. When the locks are in their locked positions, the secondary locks mechanically block the primary locks from moving out of their locked positions. The secondary locks are biased into their locked positions via actuators (e.g., electric actuators, hydraulic actuators, pneumatic actuators, etc.). In some disclosed examples, the FWT apparatus may include one or more fold brakes to maintain the wingtips in a folded position.

In general, the example FWT apparatus disclosed herein utilizes an example FWT control module to monitor and control the FWT apparatus. The example FWT control module may obtain sensor information and perform calculations based on the sensor information. In some examples, the FWT control module determines a state and/or a status of a component of the example FWT apparatus. For example, the FWT control module may obtain a measurement from a position sensor and compare the measurement to a position set point to determine if one or more components related to the position sensor are non-operational (e.g., one or more components are non-responsive) or operational (e.g., one or more components are responsive, one or more components are functional, etc.). For example, the status of the component and/or the system may be operational, non-operational, responsive, non-responsive, etc. In some examples, the FWT control module may determine that an input (e.g., a measurement from a sensor, an input from a flight deck, etc.) includes a non-responsive status. For example, the input may include a null index value, a value that is out of a range of permitted values for the value, a value that does not update when expected, etc.

The example FWT control module described herein may include additional module apparatus to perform functions related to the monitoring and the control of the example FWT apparatus. For example, the FWT control module may include one or more sub-modules to perform the monitoring and control functions of the FWT apparatus. The sub-modules may be responsible for individual tasks such as, for example, obtaining information (e.g., network information, sensor information, etc.), determining a status of a sub-component or a sub-system of the example FWT apparatus, perform output command validations, etc. The sub-modules may be responsible for enabling different functions of the FWT apparatus, such as, for example, the FWT apparatus actuator system, a remote electronics unit, a component (e.g., an actuator, a motor, a valve, etc.), etc. In some examples, the enabling of the different functions of the FWT apparatus includes modifying a value of a flag. As used herein, the flag is a variable in computer and/or machine readable instructions that may alert the FWT apparatus of a status of the function associated with the flag.

The example FWT control module described herein may determine and/or execute one or more sequences to automatically (e.g., without user input, without user control, etc.) control the FWT apparatus. In some examples, the FWT control module may determine a normal operation sequence for the FWT apparatus based on the status of the sub-components and the sub-systems of the FWT apparatus. For example, the FWT control module may determine a normal operation sequence to move the FWT apparatus from a folded position to the extended position. The normal operation sequence may be based on the operational status of the sub-components and the sub-systems. In some examples, the FWT control module may modify and/or prematurely end the normal operation sequence based on the obtained status information.

In some instances, the FWT control module may determine and/or execute a non-responsive sequence to automatically (e.g., without user input, without user control, etc.) control the FWT apparatus based on the status of the sub-components and the sub-systems of the FWT apparatus. For example, the FWT control module may determine a non-responsive sequence to move the FWT apparatus from a folded position to a safe-state position. The non-responsive sequence may be based on the non-responsive status of at least one of the sub-components and/or the sub-systems. In some examples, the FWT control module may prematurely end the normal operation sequence and transition to the non-responsive sequence based on the obtained status information.

FIG. 1 is a schematic illustration of an aircraft 100. The aircraft 100 includes wings 102,104 coupled to a fuselage 106. Engines 108,110 are coupled to the wings 102,104. Slats 112,114 and flaps 116,118 are operatively coupled to the wings 102,104. Additional aircraft control surfaces of the aircraft 100 include horizontal stabilizers 120,122 operatively coupled to elevators 124,126 and a vertical stabilizer 128 coupled to the fuselage 106.

In the illustrated example of FIG. 1, the wings 102,104 are depicted as having fixed surfaces 130,132 and moveable surfaces 134,136. The fixed surfaces 130,132 may be inboard portions of the wings 102,104 that may be attached to the fuselage 106, while moveable surfaces 134,136 may be operable to move relative to the fixed surfaces 130,132. For example, the fixed surface 130 may be an inboard portion of the wing 102 while the moveable surface 134 may be operable to move relative to the fixed surface 130. The moveable surfaces 134,136 may be operable relative to axes 138,140. For example, the moveable surface 134 may be operable relative to the axis 138.

In the illustrated example of FIG. 1, the moveable surfaces 134,136 may be referred to as moveable, foldable, or folding wingtips of the wings 102,104. For example, the moveable surface 134 may be a folding wingtip of the wing 102. As used herein, a folding wingtip is a wingtip configured to move relative to a fixed surface of the wing. The folding wingtips may have different angles, movement patterns, sizes, and other parameters, dependent on the aircraft arrangement and/or aircraft implementation and/or application.

In the illustrated example of FIG. 1, the moveable surfaces 134,136 are depicted in a folded position. The moveable surfaces 134,136 may move from extended positions 142,144 to the folded positions 146,148. The extended positions 142,144 may be positions in which the moveable surfaces 134,136 are at an angle of approximately zero degrees with respect to the axes 138,140. For example, the moveable surface 134 may move from the extended position 142 to the folded position 146 in a direction 150. In another example, the moveable surface 136 may move from the extended position 144 to the folded position 148 in a direction 152. In some instances, the moveable surfaces 134,136 may move from the extended positions 142,144 to intermediate positions, where the intermediate positions are between the extended positions 142,144 and the folded positions 146,148.

The aircraft 100 of FIG. 1 is an example of an aircraft in which a folding wingtip (FWT) apparatus 154,156 may be implemented. In the illustrated example, the FWT apparatus 154,156 may move the moveable surfaces 134,136 from the extended positions 142,144 to the folded positions 146,148 or intermediate positions. In some examples, the FWT apparatus 154,156 may move the moveable surfaces 134, 136 from the folded positions 146,148 to the extended positions 142,144 or intermediate positions. Although there are two example FWT apparatus 154,156 depicted in the illustrated example, alternatively or additionally there may be one FWT apparatus or more than two FWT apparatus included in an aircraft implementation where one or more than two folding wingtips are utilized.

In the illustrated example of FIG. 1, the FWT apparatus 154,156 of the aircraft 100 include example FWT control modules 158,160 to control and/or monitor the FWT apparatus 154,156. There are two example FWT control modules 158,160 located near a cockpit 180 of the aircraft 100, however the FWT control modules 158,160 may have one or more parts located elsewhere on the aircraft 100. Although there are two example FWT control modules 158,160 depicted in the illustrated example, there may be one FWT control module or more than two FWT control module included in the aircraft implementation where one or more than two folding wingtips are utilized.

In some examples, the aircraft 100 may have one or more FWT control module for each aircraft control surface and/or FWT apparatus. For example, the aircraft 100 may use the FWT control modules 158,160 to monitor and/or control the moveable surface 134 of the wing 102. In another example, the aircraft 100 may use the FWT control modules 158,160 to monitor and/or control one or more of the slats 112,114, the flaps 116,118, the elevators 124,126, and/or the vertical stabilizer 128. In some examples, the aircraft 100 may have a single FWT control module to monitor and/or control a plurality of aircraft control surfaces and/or FWT apparatus. For example, the aircraft 100 may use the FWT control module 158 to monitor and/or control the moveable surfaces 134,136 of the wings 102,104. In some examples, the FWT control modules 158,160 monitor a plurality of aircraft control surfaces (e.g., an elevator, a flap, a folding wingtip, etc.) and cause an additional device (e.g., an additional control module, an additional control system, etc.) to control (e.g., send a command signal) the plurality of aircraft control surfaces. For example, the FWT control modules 158,160 may monitor a status of the elevator 124 and send the status to an elevator control module, where the elevator control module may use the status to control the elevator 124. In some instances, the FWT control modules 158,160 monitor the plurality of aircraft control surfaces independently of the additional device (e.g., the additional control module, the additional control system, etc.). For example, the FWT control modules 158,160 may monitor the status of the elevator 124. The elevator control module may monitor and/or control the elevator 124 with or without information (e.g., a command, an input, a status, etc.) received from the FWT control modules 158,160.

In the illustrated example of FIG. 1, the example FWT control modules 158,160 may monitor statuses of the FWT apparatus 154,156, and based on the statuses, control the FWT apparatus 154,156 to adjust position(s) thereof. For example, the FWT control modules 158,160 may obtain a measurement from a sensor 162 to obtain flight phase information and/or flight stage information. In some examples, the FWT control modules 158,160 may determine a flight phase or a flight stage from the obtained flight phase information and/or the flight stage information. For example, the flight phase and/or the flight stage may correspond to the aircraft 100 in flight, in motion on a ground surface (e.g., taxiing to an aircraft gate), motionless on the ground surface (e.g., docked at an aircraft gate), landing, taking-off, etc. The example FWT control modules 158,160 may also obtain a measurement from sensors 164,166 to determine the status of the component and/or the system of the FWT apparatus 154,156. For example, the sensors 164,166 may determine a position of an actuator (e.g., an isolation valve, a pneumatic valve, etc.), a speed of a motor (e.g., a hydraulic motor, a servo motor, etc.), a pressure measurement (e.g., an air pressure, a hydraulic pressure, etc.), etc. There are example sensors 164,166 located on the wings 102,104 of the aircraft 100, however there may be additional sensors located elsewhere on the aircraft 100 to monitor the components and/or the systems of the FWT apparatus 154,156. The example FWT control modules 158,160 may adjust the moveable surfaces 134,136 from deployed positions to un-deployed positions. For example, the FWT control module 158 may adjust the moveable surface 134 from the extended position 142 to the folded position 146 based on at least one of the flight stage information, the component status, and/or the system status of the FWT apparatus 154, the measurement(s) from the sensor(s) 162,164,166 etc. In some examples, the extended positions 142,144 are the deployed positions. In some instances, the folded positions 146,148 are the undeployed positions.

In the illustrated example of FIG. 1, the example FWT control modules 158,160 obtain information from and send commands to remote electronics units (REUs) 168,170. In the illustrated example, there is an REU on each of the wings 102,104. For example, the REUs 168,170 are located on respective ones of the wings 102,104. The REUs 168,170 may obtain sensor information from the sensors 164,166 related to the FWT apparatus 154,156. The REUs 168,170 may also send commands (e.g., actuation commands) to the components and/or the systems of the FWT apparatus 154, 156. For example, the REU 168 may send a command to an actuator of the FWT apparatus 154 to move the FWT apparatus 154 from the extended position 142 to the folded position 146. The REU 168 may obtain sensor information related to the FWT apparatus 154. For example, the REU 168 may obtain a speed of a servo motor, a position of the moveable surface 134, etc. from the FWT apparatus 154. Although there are two REUs 168,170 depicted in FIG. 1, there may be one REU or more than two REUs to monitor and control the FWT apparatus 154,156. In some examples, the REUs 168,170 independently monitor and/or control the FWT apparatus 154,156. For example, the REUs 168,170 may monitor and/or control the FWT apparatus 154,156 independently of receiving information (e.g., a command, an input, a status, etc.) from the FWT control modules 158,160. For example, the REUs 168,170 may monitor and/or control the FWT apparatus 154,156 with or without receiving the information (e.g., the command, the input, the status, etc.) from the FWT control modules 158,160, where the FWT control modules 158,160 are monitoring the FWT apparatus 154,156.

Figure 2A:
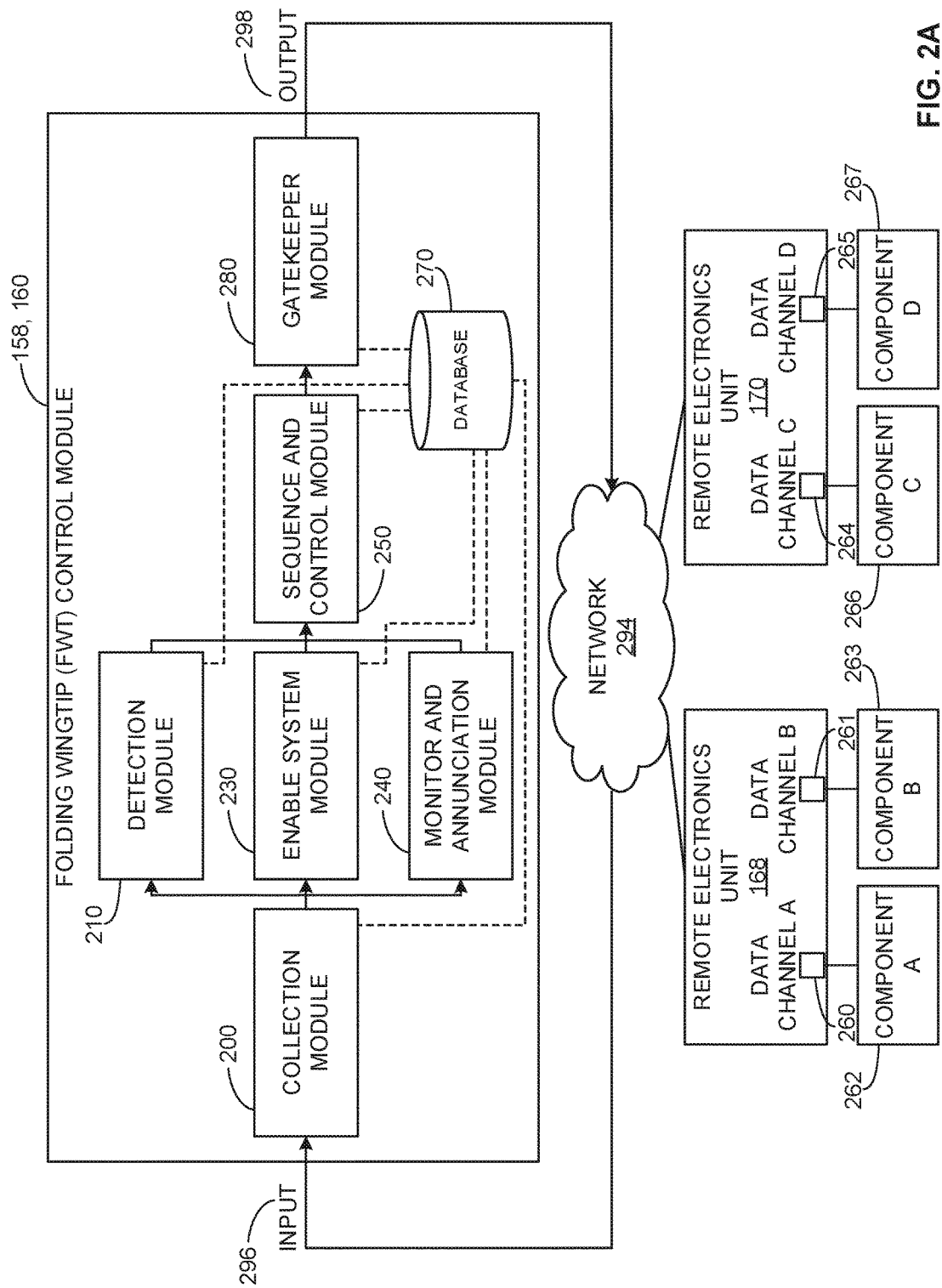
FIGS. 2A and 2B are block diagrams of an example implementation of an example folding wingtip control module apparatus.

FIG. 2A is a block diagram of an example implementation of the folding wingtip (FWT) control modules 158,160 of FIG. 1. The example FWT control modules 158,160 monitor and control the FWT apparatus 154,156 of FIG. 1. The example FWT control modules 158,160 include an example collection module 200, an example detection module 210, an example enable system module 230, an example monitor and annunciation module 240, an example sequence and control module 250, an example database 270, and an example gatekeeper module 280.

In the illustrated example of FIG. 2A, the example FWT control modules 158,160 include the collection module 200 to query, filter, obtain, process, and/or select an input 296 and/or information from the database 270 regarding a value for a flag, a status, a state, a variable, etc. The input 296 may include one or more inputs. In some examples, the collection module 200 obtains inputs from the REUs 168,170 that include multiple data acquisition channels via a network 294. In the illustrated example, the REU 168 has a data channel A 260 and a data channel B 261. The data channel A 260 is in communication with a component A 262 and the data channel B 261 is in communication with a component B 263. The REU 170 has a data channel C 264 and a data channel D 265. The data channel C 264 is in communication with a component C 266 and the data channel D is in communication with a component D 267. In some examples, the collection module 200 may disable or enable an input or data channel based on the status of the component and/or the system in communication with the REUs 168,170. For example, the collection module 200 may disable the data channel A 260 because the data channel A 260 is obtaining a non-responsive status from the component A 262. In another example, the collection module 200 may enable the data channel B 261 because the data channel B 261 is not obtaining a non-responsive status from the component B 263. In yet another example, the collection module 200 may disable the data channel A 260 and the data channel B 261. The collection module 200 may enable the data channel C 264 because the data channel C 264 is not obtaining a non-responsive status from component C 266. The collection module 200 may disable or enable additional data channels in a similar manner as described above.

In some examples, the input 296 to the FWT control modules 158,160 via the collection module 200 is obtained from an additional control module (e.g., an aircraft control surface control module, a flight control module, etc.), an external computer system to an aircraft (e.g., a computer system on another aircraft in the vicinity, a remote server, a satellite, etc.), an onboard sensor (e.g., an altitude sensor, a speed sensor, etc.), etc. The input 296 may be unprocessed information (e.g., non-manipulated data from an additional control module, non-scaled data from a sensor, etc.) or processed information (e.g., manipulated data from an additional control module, scaled data from a sensor, etc.).

In some examples, the input 296 may be a calculated value based on the unprocessed information, the processed information, and/or a combination thereof. In some instances, the input 296 may be obtained from the database 270. For example, the collection module 200 may select a previous value of a sensor measurement, a previous calculated value for a parameter, etc. to be used by one or more algorithms, processes, programs, etc. The collection module 200 outputs unprocessed information and/or processed information based on the input 296 to the detection module 210, the enable system module 230, the monitor and annunciation module 240, and the database 270.

In the illustrated example of FIG. 2A, the example FWT control modules 158,160 include the detection module 210 to determine a status of a component and/or a system of the FWT control modules 158,160. For example, the detection module 210 may determine the status of the component and/or the system based on information provided by the collection module 200. The information provided by the collection module 200 may be unprocessed information (e.g., unscaled sensor information, calculated status information, etc.) and/or processed information (e.g., scaled sensor information, calculated status information, etc.). In some examples, the detection module 210 provides an input to an additional module (e.g., the monitor and annunciation module 240) by modifying a value of a variable (e.g., a flag) to be read by the additional module on a next control cycle of the FWT control modules 158,160. For example, the detection module 210 may set an alert flag and store the alert flag in the database 270 during a first control cycle. During a second control cycle, the monitor and annunciation module 240 may retrieve the alert flag from the database 270 and execute an action based on the alert flag. In the illustrated example, the detection module 210 outputs unprocessed information and/or processed information to the sequence and control module 250 and the database 270.

In the illustrated example of FIG. 2A, the example FWT control modules 158,160 include the enable system module 230 to enable a function of a component, a system, etc. of the FWT apparatus 154,156 of FIG. 1. For example, the enable system module 230 may enable the function of the component, the system, etc. based on information provided by the collection module 200. The information provided by the collection module 200 may be unprocessed information (e.g., unscaled sensor information, calculated status information, etc.) and/or processed information (e.g., scaled sensor information, calculated status information, etc.). In some examples, the enable system module 230 alerts the example FWT control modules 158,160 that the component, the system, etc. is enabled. In some instances, the enable system module 230 enables the function of the component, the system, etc. by modifying a value of a variable. For example, the enable system module 230 may enable the function of the component, the system, etc. by modifying a value of a flag (e.g., a flag in computer and/or machine readable instructions). In some examples, the enable system module 230 provides an input to an additional module (e.g., the monitor and annunciation module 240) by modifying the value of the variable (e.g., the flag) to be read by the additional module on a next control cycle of the FWT control modules 158,160. For example, the enable system module 230 may set an alert flag and store the alert flag in the database 270 during a first control cycle. During a second control cycle, the monitor and annunciation module 240 may retrieve the alert flag from the database 270 and execute an action based on the alert flag. In the illustrated example, the enable system module 230 outputs unprocessed information and/or processed information to the sequence and control module 250 and the database 270.

In the illustrated example of FIG. 2A, the example FWT control modules 158,160 include the monitor and annunciation module 240 to perform functions such as, for example, classify non-responsive statuses, generate alerts, monitor alerts, and send information to a user interface associated with the FWT apparatus 154,156 of FIG. 1. In some examples, the information is annunciated to an operator (e.g., a maintenance technician, a pilot, etc.) via the user interface and/or an additional output device such as a light emitting diode (LED), a speaker, etc. based on the alerts. In some examples, the monitor and annunciation module 240 monitors the status of a component and/or a system for a change in the status. For example, the monitor and annunciation module 240 may monitor the status of the component. The component status may change from responsive status to non-responsive status. The monitor and annunciation module 240 may classify the non-responsive status and generate an alert based on the component status change. In some instances, the monitor and annunciation module 240 may monitor a stage, an action, an event, etc. of an FWT apparatus operation (e.g., folding a wingtip of an FWT apparatus, unfolding a wingtip of an FWT apparatus, etc.). For example, the monitor and annunciation module 240 may monitor whether the FWT apparatus completes the FWT apparatus operation, etc. The monitor and annunciation module 240 may generate an alert based on whether the FWT apparatus completes the stage, the action, the event, etc. of the FWT apparatus operation.

In some examples, the information provided by the monitor and annunciation module 240 may be unprocessed information (e.g., unscaled sensor information, calculated status information, etc.) and/or processed information (e.g., scaled sensor information, calculated status information, etc.). For example, the monitor and annunciation module 240 may generate an alert regarding an identified non-responsive status of a component (e.g., a hydraulic solenoid, a pneumatic actuator, etc.) and send the alert to an FWT apparatus user interface. The monitor and annunciation module 240 outputs unprocessed information and/or processed information to the sequence and control module 250 and the database 270.

In the illustrated example of FIG. 2A, the example FWT control modules 158,160 include the sequence and control module 250 to determine and execute a sequence of events regarding an operation of the FWT apparatus 154,156 of FIG. 1. In some examples, the sequence and control module 250 automatically executes a normal operation sequence of events based on obtained information. For example, the sequence and control module 250 may automatically determine and execute the normal operation sequence of events based on the information from the detection module 210 (e.g., the flight deck input information, the flight stage information, etc.), the enable system module 230 (e.g., the FWT apparatus enable information, the FWT apparatus actuator enable information, etc.), the monitor and annunciation module 240 (e.g., the alert information), and the database 270. In some examples, the sequence and control module 250 determines a status of a component and/or a system based on a sensor measurement prior to executing a stage or action of the normal operation sequence. For example, the sequence and control module 250 may determine the status of the component used in the first stage prior to the first stage, and so on for subsequent stages or actions of the normal operation sequence. Additionally or alternatively, the sequence and control module 250 may determine the status of the component used in the first stage during and/or after the first stage, and so on for subsequent stages or actions of the normal operation sequence.

In some examples, the sequence and control module 250 determines that an FWT non-responsive sequence of events may be executed based on the information from the detection module 210 (e.g., the flight deck input information, the flight stage information, etc.), the enable system module 230 (e.g., the FWT apparatus enable information, the FWT apparatus actuator enable information, etc.), the monitor and annunciation module 240 (e.g., the alert information), and the database 270. In some instances, the sequence and control module 250 determines a status of a component and/or a system based on a sensor measurement prior to executing a stage or action of the non-responsive sequence. For example, the sequence and control module 250 may determine the status of the component used in the first stage prior to the first stage, and so on for subsequent stages or actions of the non-responsive sequence. Additionally or alternatively, the sequence and control module 250 may determine the status of the component used in the first stage during and/or after the first stage, and so on for subsequent stages or actions of the non-responsive sequence.

In some examples, the sequence and control module 250 may generate commands and transmit the commands to corresponding components and/or systems to execute the commands. For example, the sequence and control module 250 may generate and transmit one or more outgoing electronic commands to a component, a system, etc. of the FWT apparatus 154,156 of FIG. 1. In some examples, the sequence and control module 250 may generate a plurality of commands and store them in a database for future execution. For example, the sequence and control module 250 may issue a first command from a plurality of generated commands and store the remaining commands in the database 270. When the sequence and control module 250 determines that the first command has been completed, then the sequence and control module 250 may retrieve the second command from the database 270 and issue the second command, and so on for additional generated commands.

In some examples, the sequence and control module 250 provides an input to an additional module (e.g., the monitor and annunciation module 240) by modifying a value of a variable (e.g., a flag) to be read by the additional module on a next control cycle of the FWT control modules 158,160. For example, the sequence and control module 250 may set an alert flag and store the alert flag in the database 270 during a first control cycle. During a second control cycle, the monitor and annunciation module 240 may retrieve the alert flag from the database 270 and execute an action based on the alert flag.

In the illustrated example of FIG. 2A, the FWT control modules 158,160 include the database 270 to record data (e.g., obtained sensor information, obtained component statuses, calculated parameter values etc.). The database 270 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 270 may additionally or alternatively be implemented by one or more double data rate (DDR) memories, such as DDR, DDR2, DDR3, mobile DDR (mDDR), etc. The database 270 may additionally or alternatively be implemented by one or more mass storage devices such as hard disk drive(s), compact disk drive(s) digital versatile disk drive(s), etc. While in the example the database 270 is illustrated as a single database, the database 270 may be implemented by any number and/or type(s) of databases.

In the illustrated example of FIG. 2A, the example FWT control modules 158,160 include the gatekeeper module 280 to monitor and/or intercept outgoing electronic commands to a component and/or a system of the FWT apparatus 154,156 of FIG. 1. For example, the gatekeeper module 280 intercepts the outgoing electronic commands from the sequence and control module 250. In some examples, the gatekeeper module 280 obtains information related to the flight stage information, the FWT status information, etc. and enables the outgoing electronic commands to proceed unobstructed. In some instances, the gatekeeper module 280 modifies the outgoing electronic commands based on the obtained information. The gatekeeper module 280 produces output 298, where the outputs 298 are unmodified or modified outgoing electronic commands. The output 298 may include one or more outputs. The gatekeeper module 280 also may output unprocessed and/or processed information to the database 270. For example, the gatekeeper module 280 may store a value of the unmodified or the modified outgoing electronic command in the database 270.

In some examples, the gatekeeper module 280 may be used to monitor and/or intercept outgoing electronic commands to an aircraft control surface. For example, the gatekeeper module 280 may monitor a command to actuate or control one or more of the slats 112,114, the flaps 116,118, the elevators 124,126, and/or the vertical stabilizer 128 of FIG. 1. The gatekeeper module 280 may verify that the command controlling the aircraft control surface is valid. For example, the gatekeeper module 280 may verify that the command is valid based on the flight deck input information, the flight stage information, or, more generally, the information related to the aircraft control surface of the aircraft 100 of FIG. 1.

In the illustrated example of FIG. 2A, the example FWT control modules 158,160 may be connected to the REUs 168,170 of FIG. 1 via a network 294. The input 296 and the output 298 may be in communication with the network 294. The network 294 of the illustrated example of FIG. 1 is an aircraft process control network. However, the example network 294 may be implemented using any suitable wired and/or wireless network(s) including, for example, one or more data buses, one or more aircraft process control networks, one or more Local Area Networks (LANs), one or more wireless LANs, one or more cellular networks, one or more private networks, one or more public networks, etc. The network 294 enables the example FWT control modules 158,160 to be in communication with the REUs 168,170. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

Figure 2B:
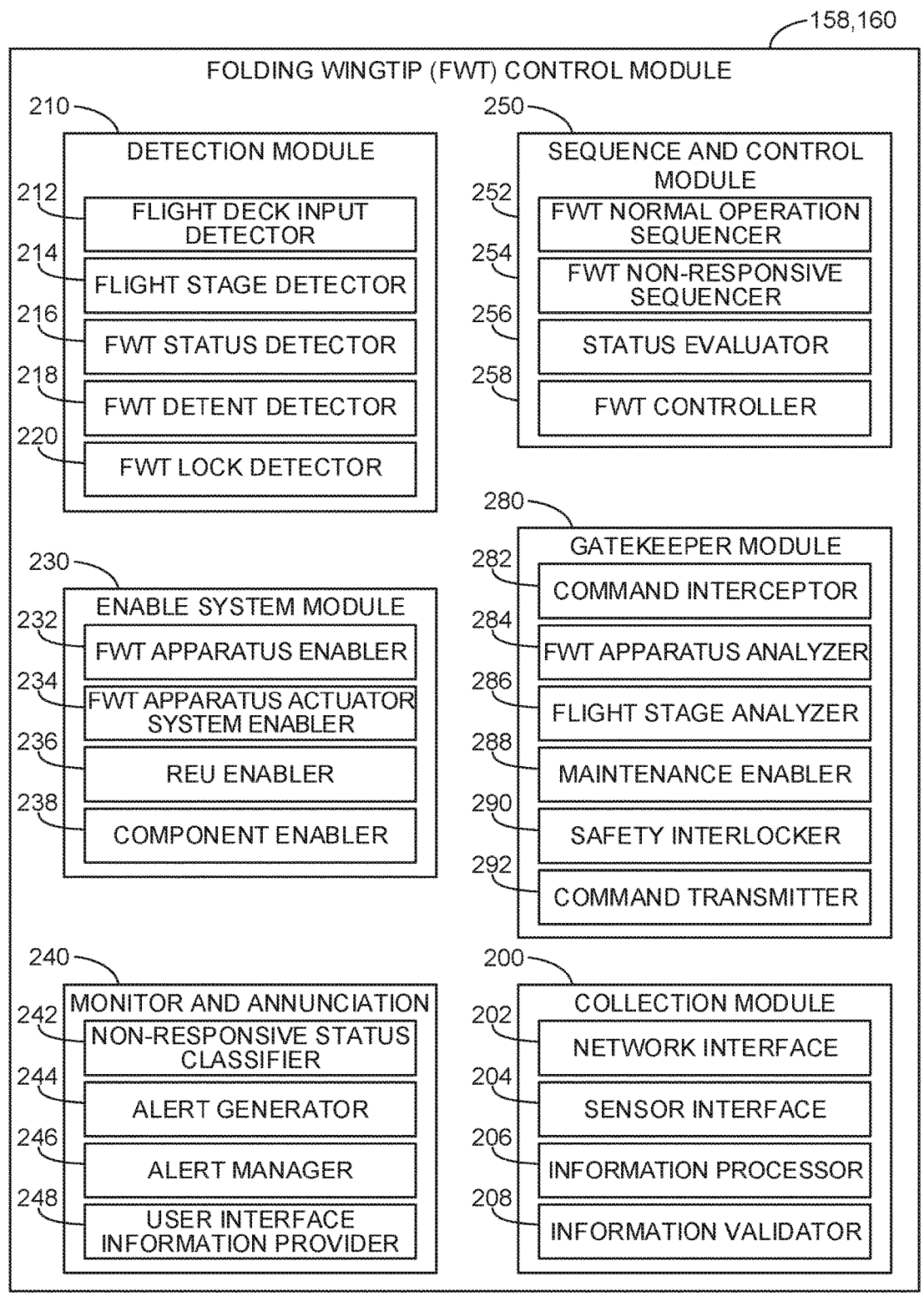

FIG. 2B is a block diagram of the example implementation of the folding wingtip (FWT) control modules 158,160 as described in FIG. 2A. The block diagram of FIG. 2A details example sub-modules or example sub-systems that may perform the monitoring and control functions of the FWT apparatus 154,156 of FIG. 1. The example sub-modules follow the data flow paths and information delivery dependencies described in FIG. 2A.

The collection module 200 of FIGS. 2A and 2B includes an example network interface 202, an example sensor interface 204, an example information processor 206, and an example information validator 208. The collection module 200 includes the network interface 202 to provide an interface to a bus and/or a network. For example, the network interface 202 may be an internal controller bus, an internal process control network, etc. The network interface 202 may implement one or more communication protocols such as, for example, bus protocols (controller area network (CAN) bus, Modbus, Profibus, etc.), Ethernet protocols (e.g., EtherCAT, Profinet, etc.), serial protocols (e.g., RS-232, RS-485, etc.) The network interface 202 may be implemented using any suitable wired and/or wireless network interface(s) including, for example, one or more data buses, one or more Local Area Networks (LANs), one or more wireless LANs, one or more cellular networks, one or more fiber optic networks, one or more satellite networks, one or more private networks, one or more public networks, etc.

In some examples, the network interface 202 enables the example FWT control modules 158,160 to be in communication with external modules and/or external systems to the FWT control modules 158,160. For example, the network interface 202 may enable the FWT control modules 158,160 to be in communication with the REUs 168,170 of FIG. 1. In some examples, the network interface 202 obtains information from the REUs 168,170. For example, the network interface 202 may obtain a component status, a sensor measurement, a system status, etc. from the REUs 168,170. In some examples, the network interface 202 stores the obtained information from the REUs 168,170 in the database 270.

The collection module 200 of FIGS. 2A and 2B includes the sensor interface 204 to interface with sensors and/or additional data acquisition systems that interface with sensors. For example, the sensor interface 204 may enable the FWT control modules 158,160 to be in communication with the sensor 162. The sensor interface 204 is an interface that collects and/or obtains sensor information. The sensor information may be obtained from sensors that output analog electrical signals (e.g., current measurements, voltage measurements, etc.) such as, for example, accelerometers, light sensors, pressure sensors, sound sensors, temperature sensors, etc. The sensor information may be obtained from sensors that output digital electrical signals such as, for example, digital accelerometers, digital temperature sensors, etc. Additional sensors with analog outputs and/or digital outputs may include, for example, chemical sensors, flow sensors, force sensors, heat sensors, magnetic sensors, position sensors, presence sensors, proximity sensors, speed sensors, etc.

The collection module 200 of FIGS. 2A and 2B includes the information processor 206 to select and/or process an input to the FWT control modules 158,160. For example, the information processor 206 may select and/or process the input 296. In some examples, the information processor 206 selects obtained inputs of interest to be used by one or more algorithms, processes, programs, etc. For example, the information processor 206 may process a value of an input by converting (e.g., converting using a conversion calculation, converting to different units of measure, etc.), scaling (e.g., scaling using a scaling factor), and/or translating (e.g., translating using a pre-determined curve, translating using a pre-determined equation) the value of the input 296 for use by the FWT control modules 158,160. In some examples, the information processor 206 selects the input 296 by querying the database 270. In response to the database 270 receiving the query sent from the information processor 206, the database 270 transmits the input 296 to the information processor 206.

The collection module 200 of FIGS. 2A and 2B includes the information validator 208 to validate an input to the FWT control modules 158,160. For example, the information validator 208 may validate the input 296. In some examples, the information validator 208 analyzes the input 296 to determine whether the input 296 is to be deemed reliable and/or trustworthy and subsequently to be used by the FWT control modules 158,160. In some examples, the information validator 208 compares the input 296 to a range of acceptable values for the input 296. The information validator 208 may obtain the range of acceptable values for the input 296 from the database 270. In response to obtaining the range of acceptable values, the information validator 208 may compare the input 296 to the obtained range of acceptable values. For example, the information validator 208 may analyze a pressure measurement input of 1000 pounds per square inch (PSI) for a pressure sensor. The information validator 208 may obtain a pressure range of 0-600 PSI for the pressure sensor from the database 270. In response to obtaining the pressure range for the pressure sensor, the information validator 208 may compare the pressure measurement input of 1000 PSI to the obtained pressure range of 0-600 PSI and determine that the pressure measurement input is out of range. In response to determining that the input 296 is out of range, the information validator 208 may invalidate the input 296 by ignoring the input 296, setting the value of the input 296 to another value (e.g., to a known valid value, to a zero value, to a null value, etc.). The information validator 208 may also alert the FWT control modules 158,160 that the input 296 is invalid. For example, the information validator 208 may set a flag (e.g., an invalid input flag, an alert flag, etc.) alerting the FWT control modules 158,160 that the input 296 is invalid.

In some examples, the information validator 208 analyzes the input 296 to determine whether the input 296 is valid based on a status of an aircraft (e.g., an aircraft is above 10,000 feet, landing gear has been deployed, etc.). For example, the information validator 208 may determine that although though the value of the input 296 is within an acceptable range of values for the input 296, the value of the input 296 is invalid based on the status of the aircraft. For example, the information validator 208 may receive the input 296, where the input 296 is a command input to enable the FWT actuation system to move the moveable surface 134 of FIG. 1 from the extended position 142 to the folded position 146. The information validator 208 may determine that the value of the command input is within an acceptable range of values for the command input. However, the information validator 208 may determine that the aircraft is in flight (e.g., the aircraft has a speed above 100 miles per hour, the aircraft is at an altitude greater than 1,000 feet, etc.). In response to determining that the aircraft is in flight, the information validator 208 invalidates the command input. For example, the information validator 208 may set the value of the input 296 to zero and set a flag (e.g., an invalid input flag) alerting the FWT control modules 158, 160 that the value of the input 296 is invalid.

The detection module 210 of FIGS. 2A and 2B includes an example flight deck input detector 212, an example flight stage detector 214, an example FWT status detector 216, an example FWT detent detector 218, and an example FWT lock detector 220. The detection module 210 of FIGS. 2A and 2B includes the flight deck input detector 212 to detect a status of an input from a cockpit or flight deck of an aircraft. For example, the flight deck input detector 212 may obtain the flight deck input status information from the flight deck of the aircraft 100. The flight deck is an area typically near the front of the aircraft from which a pilot controls the aircraft. The flight deck of the aircraft includes flight instruments on an instrument panel, flight controls that enable the pilot to fly the aircraft, etc.

In some examples, the flight deck includes the flight instruments and/or the flight controls for an FWT apparatus. For example, the flight deck may include buttons, knobs, levers, switches, etc. that the pilot may actuate to provide an input to the FWT control modules 158,160 to monitor and/or to control the FWT apparatus 154,156 of FIG. 1. In some examples, actuating one or more of the buttons, knobs, levers, switches, etc. in the flight deck begins a folding wingtip operation (e.g., folding moveable surfaces 134,136, unfolding moveable surfaces 134,136, etc.). For example, the flight deck may include a lever, that when actuated, provides the input 296 to the FWT control modules 158,160 to move the FWT apparatus 154,156 to the extended positions 142,144. The flight deck input detector 212 may determine that the status of the lever (e.g., the output of the lever) is either enabled (e.g., move the FWT apparatus 154,156 to the extended positions 142,144) or disabled (e.g., do not move the FWT apparatus 154,156 to the extended positions 142,144). For example, when the lever is actuated to move the FWT apparatus 154,156 from the folded positions 146,148 to the extended positions 142,144, the flight deck input detector 212 may determine that the input 296 from the lever is enabled.

The detection module 210 of FIGS. 2A and 2B includes the flight stage detector 214 to detect a stage of a flight plan or a flight stage being executed by an aircraft during a time period. A flight plan may include flight stages such as, for example, disembarking from an airport gate, taxiing to a runway, taking off from the runway, flying at a cruising altitude, landing on the runway, etc. In some examples, the flight stage detector 214 determines the flight stage of the aircraft based on a measurement of a sensor (e.g., a measurement from an altitude sensor, a measurement from a speed sensor, a measurement from a landing gear position sensor, etc.). In some instances, the flight stage detector 214 determines the flight stage of the aircraft based on a status of the aircraft such as, for example, a deployment of landing gear, a decreasing altitude of the aircraft, etc.

The detection module 210 of FIGS. 2A and 2B includes the FWT status detector 216 to detect a status of an FWT apparatus. For example, the FWT status detector 216 may detect the statuses of the FWT apparatus 154,156 of FIG. 1. In some examples, the status of the FWT apparatus may be a mode of the FWT apparatus. The mode may be, for example, an active mode (e.g., a mode that involves folding a wingtip, a mode that involves unfolding a wingtip, etc.) or a standby mode (e.g., a mode that involves a wingtip not moving). For example, the FWT status detector 216 may detect the status of the FWT apparatus 154,156 to be in the active mode or in the standby mode. In some examples, the status of the FWT apparatus may be a position of the FWT apparatus. For example, the statuses of the FWT apparatus 154,156 may be the positions of the moveable surfaces 134,136 of FIG. 1, where the positions are the extended positions 142,144, the folded positions 146,148, or the intermediate positions. For example, the FWT status detector 216 may detect the status of the FWT apparatus 154 to be the extended position, the folded position, the intermediate position, etc.

The detection module 210 of FIGS. 2A and 2B includes the FWT detent detector 218 to detect a position of one or more latch pins of an FWT apparatus. For example, the FWT detent detector 218 may detect the position of one or more latch pins of the FWT apparatus 154,156 of FIG. 1. In some examples, the FWT detent detector 218 determines the position to be a latched position (e.g., an extended position) or an unlatched position (e.g., a retracted position). The latch pins may be latched or extended when the wingtips are in the folded position or the extended position. For example, the FWT detent detector 218 may determine that the latch pins are extended based on a measurement from a latch position sensor (e.g., an inductive proximity sensor, an angle position sensor, a linear position sensor, etc.). The latch pins may be retracted when the FWT apparatus 154,156 are in the process of moving from one position to another position. For example, the FWT detent detector 218 may determine that the latch pins of the FWT apparatus 154,156 are retracted based on the measurement from the latch position sensor.

The detection module 210 of FIGS. 2A and 2B includes the FWT lock detector 220 to detect a position of one or more locks of an FWT apparatus. For example, the FWT lock detector 220 may detect the position of one or more locks of the FWT apparatus 154,156 of FIG. 1. In some examples, the FWT lock detector 220 determines the position to be a locked position, an unlocked position, or an intermediate position (e.g., a middle position, a position between the locked position and the unlocked position, etc.). The FWT lock detector 220 may detect the position for a plurality of locks such as, for example, one or more primary locks, one or more secondary locks, etc. For example, the FWT lock detector 220 may determine that the position of a primary lock of the FWT apparatus 154,156 are in the locked position. In another example, the FWT lock detector 220 may determine that the position of a secondary lock is in the middle position. In some examples, the FWT lock detector 220 determines the position of the primary locks and/or the secondary locks based on a measurement from a lock position sensor (e.g., an inductive proximity sensor, an angle position sensor, a linear position sensor, etc.).

The enable system module 230 of FIGS. 2A and 2B includes an example FWT apparatus enabler 232, an example FWT apparatus actuator system enabler 234, an example REU enabler 236, and an example component enabler 238. The enable system module 230 of FIGS. 2A and 2B includes the FWT apparatus enabler 232 to enable an FWT apparatus. For example, the FWT apparatus enabler 232 may enable the FWT apparatus 154,156 of FIG. 1. In some examples, the FWT apparatus enabler 232 may set a flag (e.g., an enable flag, an alert flag, etc.) alerting the FWT control modules 158,160 that the FWT apparatus is enabled and/or disabled. For example, the FWT apparatus enabler 232 may set an enable FWT apparatus flag to enable the monitoring and/or the controlling of the FWT apparatus 154,156 by the FWT control modules 158,160.

In some examples, in response to the FWT apparatus enabler 232 enabling the FWT apparatus 154,156, the FWT control modules 158,160 are permitted to perform a plurality of actions. For example, in response to the FWT apparatus enabler 232 enabling the FWT apparatus 154,156 (e.g., by setting the enable FWT apparatus flag for the FWT apparatus 154,156), the FWT control modules 158,160 may perform a function such as actuating a component of the FWT apparatus 154,156 (e.g., locking a primary lock, extending a latch pin, etc.), enabling a sub-system of the FWT apparatus 154,156 (e.g., enabling the FWT apparatus actuator, enabling the remote electronics unit, etc.), etc. In some instances, the FWT control modules 158,160 cannot monitor and/or control the FWT apparatus without the FWT apparatus enabler 232 enabling the FWT apparatus. For example, if the FWT apparatus enabler 232 does not set the enable FWT apparatus flag for the FWT apparatus 154,156 then the FWT control modules 158,160 may not be permitted to monitor and/or to control the FWT apparatus 154,156.

The enable system module 230 of FIGS. 2A and 2B further includes the FWT apparatus actuator system enabler 234 to enable an actuator system of an FWT apparatus. For example, the FWT apparatus actuator system enabler 234 may enable the actuator system (e.g., the hydraulic system, the pneumatic system, etc.) of the FWT apparatus 154,156 of FIG. 1. In some examples, the FWT apparatus actuator system enabler 234 may set a flag (e.g., an enable flag, an alert flag, etc.) alerting the FWT control modules 158,160 that the FWT apparatus actuator system is enabled and/or disabled. For example, the FWT apparatus actuator system enabler 234 may set an enable FWT apparatus actuator system flag to enable the monitoring and/or the controlling of the FWT apparatus actuator system of the FWT apparatus 154,156 by the FWT control modules 158,160.

In some examples, in response to the FWT apparatus actuator system enabler 234 enabling the FWT apparatus actuator system, the FWT control modules 158,160 are permitted to perform a plurality of actions. For example, in response to the FWT apparatus actuator system enabler 234 enabling the FWT apparatus actuator system of the FWT apparatus 154,156 (e.g., by setting the enable FWT apparatus actuator system flag), the FWT control modules 158,160 may perform a function such as actuating a component of the FWT actuator system (e.g., actuating a solenoid, actuating a servo motor, actuating a valve, etc.), enabling a sub-system of the FWT apparatus actuator system (e.g., enabling an electrical system, enabling a hydraulic system, enabling a pneumatic system, etc.), etc. In some instances, the FWT control modules 158,160 cannot monitor and/or control the FWT apparatus actuator system without the FWT apparatus actuator system enabler 234 enabling the FWT apparatus actuator system. For example, if the FWT apparatus actuator system enabler 234 does not set the enable FWT apparatus actuator system flag for the FWT apparatus 154,156, then the FWT control modules 158,160 may not be permitted to monitor and/or to control the FWT apparatus actuator system of the FWT apparatus 154,156.

The enable system module 230 of FIGS. 2A and 2B additionally includes the remote electronics unit (REU) enabler 236 to enable an REU. For example, the REU enabler 236 may enable the REUs 168,170 of FIG. 1. In some examples, the REU enabler 236 may set a flag (e.g., an enable flag, an alert flag, etc.) alerting the FWT control modules 158,160 that the REUs 168,170 is enabled and/or disabled. For example, the REU enabler 236 may set an enable REU flag to enable the monitoring and/or the controlling of the REUs 168,170 by the FWT control modules 158,160. In some examples, the enabling of the REU enables the REU to perform a function such as, for example, actuating a component of the FWT actuator system (e.g., actuating a solenoid, actuating a servo motor, etc.) enabling a sub-system of the FWT actuator system (e.g., enabling an electrical system, enabling a hydraulic system, enabling a pneumatic system, etc.), obtain sensor information, etc.

In some examples, in response to the REU enabler 236 enabling the REUs 168,170, the FWT control modules 158,160 are permitted to perform a plurality of actions. For example, in response to the REU enabler 236 enabling the REUs 168,170 (e.g., by setting the enable REU flag for the REUs 168,170), the FWT control modules 158,160 may perform a function such as actuating a component of the FWT apparatus 154,156 (e.g., locking a primary lock, extending a latch pin, etc.) via the REUs 168,170. In some instances, the FWT control modules 158,160 cannot monitor and/or control the REUs 168,170 without the REU enabler 236 enabling the REUs 168,170. For example, if the REU enabler 236 does not set the enable REU flag for the REUs 168,170, then the FWT control modules 158,160 may not be permitted to monitor and/or to control the REUs 168,170.

The enable system module 230 of FIGS. 2A and 2B further includes the component enabler 238 to enable one or more components of an FWT apparatus. For example, the component enabler 238 may enable one or more components of the FWT apparatus 154,156 of FIG. 1. A component of the FWT apparatus 154,156 may include, for example, an actuator, a motor, a solenoid, a valve, etc. The component may also include FWT apparatus components such as, for example, a fold brake, a latch pin, a lock (e.g., a primary lock, a secondary lock, etc.), etc. For example, the component may be a primary lock of the FWT apparatus 154,156. The component of the FWT apparatus may include a sensor that obtains a measurement and/or a status of the component. In some examples, the component enabler 238 may enable the component based on the sensor measurement. For example, the component enabler 238 may enable a hydraulic motor based on a measurement from a hydraulic pressure sensor that satisfies a threshold (e.g., a measurement from a hydraulic pressure that is greater than 500 PSI). In some examples, the component enabler 238 may set a flag (e.g., an enable flag, an alert flag, etc.) alerting the FWT control modules 158,160 that the one or more components are enabled. For example, the component enabler 238 may set an enable component flag to enable the monitoring and/or the controlling of the component by the FWT control modules 158,160.

In some examples, in response to the component enabler 238 enabling the component, the FWT control modules 158,160 are permitted to perform a plurality of actions. For example, in response to the component enabler 238 enabling the component, the FWT control modules 158,160 may perform an action such as actuating the component of the FWT apparatus 154,156 (e.g., opening a valve, locking a primary lock, extending a latch pin, etc.). In another example, in response to the component enabler 238 enabling the component, the FWT control modules 158,160 may obtain information from a sensor monitoring the component. For example, in response to the component enabler 238 enabling the component, the FWT control modules 158,160 may obtain information from a speed sensor monitoring a speed of a hydraulic motor of the FWT apparatus 154,156. In some instances, the FWT control modules 158,160 cannot monitor and/or control the component without the component enabler 238 enabling the component. For example, if the component enabler 238 does not set the enable component flag for a servo motor, then the FWT control modules 158,160 may not be permitted to monitor and/or to control the servo motor.

The monitor and annunciation module 240 of FIGS. 2A and 2B includes an example non-responsive status classifier 242, an example alert generator 244, an example alert manager 246, and an example user interface information provider 248. The monitor and annunciation module 240 includes the non-responsive status classifier 242 to classify a non-responsive status of a component. For example, the non-responsive status classifier 242 may classify a non-responsive status of a pneumatic actuator for the FWT apparatus 154,156 of FIG. 1. In some examples, the non-responsive status classifier 242 obtains one or more non-responsive statuses from the database 270. In some instances, the non-responsive status classifier 242 selects a non-responsive status to classify and/or to process from a plurality of obtained non-responsive statuses.

In some examples, the non-responsive status classifier 242 classifies the non-responsive status as an isolated or a systemic issue. For example, the non-responsive status classifier 242 may obtain a non-responsive status of a first component (e.g., a pneumatic actuator). The non-responsive status classifier 242 may subsequently obtain a status for a second component (e.g., an air pressure sensor, where the second component is related to the first component (e.g., the air pressure sensor is monitoring the pneumatic actuator). If the second component also returns a non-responsive status, then the non-responsive status classifier 242 may classify the non-responsive status of the first component as a systemic issue because both the first component and the second component have a non-responsive status. For example, the pneumatic actuator may be non-responsive because the air pressure measured by the air pressure sensor is below a sufficient level necessary to actuate the pneumatic actuator. If the second component does not return a non-responsive status, then the non-responsive status classifier 242 may classify the non-responsive status of the first component as an isolated issue to the first component. For example, the measured air pressure may be at a sufficient level to actuate the pneumatic actuator. The pneumatic actuator may be non-responsive because of another issue (e.g., a pneumatic valve is not open to provide air to the pneumatic actuator).

In some examples, the non-responsive status classifier 242 determines whether a non-responsive status of a component and/or a system can be mitigated. For example, the non-responsive status classifier 242 may determine that a component of the FWT apparatus 154,156 may be bypassed in response to the component having a non-responsive status. In some examples, the non-responsive status classifier 242 determines that the component with the non-responsive status has one or more redundant components.

For example, the non-responsive status classifier 242 may determine that a hydraulic pressure sensor monitoring a hydraulic valve has a non-responsive status. The non-responsive status classifier 242 may determine that there is at least one additional hydraulic pressure sensor monitoring a hydraulic valve that does not have a non-responsive status. In response to determining that there is a redundant component, the non-responsive status classifier 242 may alert the FWT control modules 158,160 that the non-responsive status of the component can be mitigated. For example, the non-responsive status classifier 242 may set a flag (e.g., a bypass flag, a redundant component flag, a mitigation flag, etc.) alerting the FWT control modules 158,160 that the component with the non-responsive status may be bypassed.

The monitor and annunciation module 240 of FIGS. 2A and 2B includes the alert generator 244 to generate an alert based on the information obtained from the collection module 200 and/or the database 270. In some examples, the alert generator 244 may evaluate the information and determine if the information satisfies a threshold. The threshold may be a calculated value, a pre-determined value, etc. For example, the alert generator 244 may determine that a measurement from a hydraulic pressure sensor does not satisfy a hydraulic pressure threshold (e.g., a measurement is below a hydraulic pressure threshold). The measurement not satisfying the hydraulic pressure threshold may indicate that a hydraulic actuator monitored by the hydraulic pressure sensor is not responsive, that a hydraulic motor monitored by the hydraulic pressure sensor is non-responsive, etc.

In some examples, the alert generator 244 determines that a status from a component and/or a system requires a generation of an alert. For example, the alert generator 244 may determine that an obtained status from an electrically actuated solenoid is a non-responsive status and thus requires a generation of an alert. The alert generator 244 may obtain the electrically actuated solenoid status from the collection module 200 and/or the database 270. In some examples, the alert generator 244 assigns an index and/or a priority to the generated alert. For example, the index may be a criticality index that indicates a level of importance for a component and/or a system referred to in the generated alert. In response to identifying a status necessitating a generation of an alert (e.g., a measurement satisfying a threshold, a change in a component and/or a system status, etc.), the alert generator 244 may generate an alert such as, for example, displaying an alert on a user interface, propagating an alert message throughout a process control network, generating an alert log and/or an alert report, etc.

The monitor and annunciation module 240 of FIGS. 2A and 2B includes the alert manager 246 to manage the alerts generated by the alert generator 244. In some examples, the alert manager 246 processes the generated alerts by compiling them in a list, a log, a report, etc. For example, the alert manager 246 may collect the plurality of generated alerts and organize them in an alert report. The alert report may include information regarding individual alerts such as, for example, a timestamp, an index, a priority, a text-based description, an alert category, etc. In some instances, the alert report includes information regarding trend analysis of recurring alerts. For example, the alert report may indicate that a non-responsive pneumatic actuator alert occurs whenever the FWT apparatus 154,156 are actuated or when an aircraft achieves an altitude greater than 10,000 feet. In some examples, the alert manager 246 may be accessible from a user interface. For example, the alert manager 246 may be a sub-display, a sub-module, etc. of a human machine interface (HMI) in the cockpit. A pilot in the cockpit may interact with the alert manager 246 via the HMI, where the pilot may acknowledge an alert, dismiss an alert, conduct an action based on an alert, review an alert report, review an alert trend analysis, etc.

The monitor and annunciation module 240 of FIGS. 2A and 2B includes the user interface information provider 248 to process, package, and provide information to a user interface associated with an FWT apparatus. For example, the user interface information provider 248 may obtain and transmit information to a user interface associated with the FWT apparatus 154,156 of FIG. 1. The information may include a stage and/or an action related to an FWT apparatus operation, a status of a component and/or a system related to the FWT apparatus, an alert generated by the monitor and annunciation module, etc. In some examples, the user interface information provider 248 assigns a value associated with a component status and/or a system status to a variable associated with the user interface. In some instances, the user interface information provider 248 assigns information related to a generated alert to a variable associated with the user interface. In some examples, the variables may be displayed and/or logged on the user interface. For example, the user interface information provider 248 may assign a measurement obtained from a hydraulic pressure sensor to a variable associated with the user interface. The variable may be transmitted to the user interface via the network 294. The variable may be stored in the database 270 and obtained by the user interface from the database 270.

The sequence and control module 250 of FIGS. 2A and 2B includes an example FWT normal operation sequencer 252, an example FWT non-responsive sequencer 254, an example status evaluator 256, and an example FWT controller 258. The sequence and control module 250 includes the FWT normal operation sequencer 252 to determine a normal operation sequence of FWT stages and/or FWT actions to move a position of the moveable surfaces 134, 136. In some examples, the FWT normal operation sequencer 252 determines the normal operation sequence based on a sensor measurement, a component status, a system status, etc. For example, the FWT normal operation sequencer 252 may determine the normal operation sequence based on a sensor measurement that satisfies a threshold (e.g., a sufficient threshold, a satisfactory threshold, a necessary threshold, etc.). In another example, the FWT normal operation sequencer 252 may determine the normal operation sequence based on the component status and/or the system status, where the statuses do not indicate a non-responsive status.

In some examples, the FWT normal operation sequencer 252 identifies one or more FWT stages to execute a movement of the moveable surfaces 134,136 based on the obtained information (e.g., the flight deck input information, the flight stage information, etc.). In some examples, the FWT normal operation sequencer 252 identifies the FWT stages prior to executing the first FWT stage. For example, the FWT normal operation sequencer 252 may determine that there are three FWT stages to be executed to move the moveable surfaces 134,136 from the extended positions 142,144 to the folded positions 146,148. In some instances, the FWT normal operation sequencer 252 determines the FWT actions that will be executed within each of the determined FWT stages prior to executing the first FWT stage. For example, the FWT normal operation sequencer 252 may determine that there are three FWT stages and four FWT actions within each of the three FWT stages to be executed to move the moveable surfaces 134,136 from the extended positions 142,144 to the folded positions 146,148.

In some examples, the FWT normal operation sequencer 252 calculates and/or identifies a desired position of the FWT apparatus based on the obtained information. For example, the FWT normal operation sequencer 252 may calculate a desired position of the moveable surface 134 of the FWT apparatus 154 based on the obtained flight stage information of the aircraft 100. The FWT normal operation sequencer 252 may generate one or more stages and/or actions to cause the moveable surface 134 of the FWT apparatus 154 to move to the desired position from the current position of the moveable surface 134.

In some examples, the FWT normal operation sequencer 252 obtains and evaluates information prior to an execution of an FWT stage or an FWT action within the FWT stage. The FWT normal operation sequencer 252 may identify a first FWT action within a first FWT stage. For example, the FWT normal operation sequencer 252 may identify a first FWT action (e.g., opening an isolation valve) within a first FWT stage of adjusting the position of the moveable surfaces 134,136 of FIG. 1 from the extended positions 142,144 to the folded positions 146,148. For example, the FWT normal operation sequencer 252 may obtain information related to the first FWT action such as, for example, flight stage information, FWT status information, etc. to determine if the moveable surfaces 134,136 may be moved based on the obtained information. Additionally or alternatively, the FWT normal operation sequencer 252 may obtain and evaluate information during and/or after the execution of the FWT stage or the FWT action within the FWT stage.

In some examples, the FWT normal operation sequencer 252 obtains information related to the components and/or the systems involved in the first FWT action prior to the first FWT action. For example, if the first FWT action is to unlock a primary lock of the FWT apparatus 154,156 using a hydraulic actuator, then the FWT normal operation sequencer 252 may obtain an enable hydraulic actuator status, a measurement from a hydraulic pressure sensor monitoring the hydraulic actuator, etc. prior to the first FWT action. The FWT normal operation sequencer 252 may cause the first FWT action to be completed when the status of the component and/or the system of the FWT apparatus 154,156 prior to the first FWT action is determined to be responsive. For example, the FWT normal operation sequencer 252 may cause a generation of a command to execute the first FWT action to be generated, transmitted, executed, etc. In some examples, the FWT normal operation sequencer 252 identifies and/or executes a second FWT action based on a completion of the first FWT action. The completion of the first FWT action may be determined by a measurement of a sensor. For example, the second FWT action may not be executed until the sensor measurement indicates that the first FWT action is complete. In some instances, the FWT normal operation sequencer 252 identifies and/or executes a second FWT stage based on the completion of the first FWT action. Additionally or alternatively, the FWT normal operation sequencer 252 may obtain information related to the components and/or the systems involved in the first FWT action during and/or after the first FWT action.

The sequence and control module 250 of FIGS. 2A and 2B includes the FWT non-responsive sequencer 254 to determine a non-responsive sequence of FWT stages and/or FWT actions. In some examples, the FWT non-response sequencer 254 determines a non-responsive sequence based on a non-responsive status of a component and/or a system. For example, the FWT non-responsive sequencer 254 may determine a non-responsive sequence based on the non-responsive status of a component and/or a system of the FWT apparatus 154,156. In some examples, the non-responsive status indicates that an FWT stage and/or an FWT action may not be executed. For example, a non-responsive status of a hydraulic actuator operatively coupled to a latch pin indicates that a retraction of the latch pin may not be executed.

In some examples, the FWT non-responsive sequencer 254 identifies a non-responsive sequence of one or more FWT stages and/or FWT actions when a component status and/or a system status is a non-responsive status. In some instances, the FWT non-responsive sequencer 254 determines a non-responsive sequence of the FWT stages and the corresponding FWT actions to move the moveable surfaces 134,136 to an intermediate position. For example, the FWT non-responsive sequencer 254 may determine the non-responsive sequence of FWT stages and corresponding FWT actions to move the moveable surfaces 134,136 from the extended positions 142,144 to a position in between the extended positions 142,144 and the folded positions 146,148. In some examples, the FWT non-responsive sequencer 254 determines the non-responsive sequence of the FWT stages and/or the FWT actions for an FWT apparatus to remain in place. For example, the FWT non-responsive sequencer 254 may determine a non-responsive sequence of the FWT stages and/or the FWT actions for the moveable surfaces 134,136 to remain in the folded positions 146,148. In another example, the FWT non-responsive sequencer 254 may obtain a non-responsive status from a hydraulic actuator necessary to move the moveable surfaces 134,136 from the folded positions 146,148 to the extended positions 142,144. In response to obtaining the non-responsive status from the hydraulic actuator, the FWT non-responsive sequencer 254 may determine the FWT stages and/or the FWT actions necessary to maintain the moveable surfaces 134,136 in the folded positions 146,148.

In some examples, the FWT non-responsive sequencer 254 calculates and/or identifies a desired position of the FWT apparatus 154,156 based on the obtained information. The desired position may be, for example, the extended positions 142,144 of FIG. 1 or a position between the extended positions 142,144 and the folded positions 146,148 of FIG. 1. In some instances, the FWT non-responsive sequencer 254 identifies the desired position to be the current position of the moveable surfaces 134,136. For example, the FWT non-responsive sequencer 254 may identify the desired position of the moveable surfaces 134,136 of FIG. 1 to be the folded positions 146,148. For example, the FWT non-responsive sequencer 254 may calculate a desired position of the moveable surfaces 134,136 of the FWT apparatus 154,156 based on a non-responsive component status. The FWT normal operation sequencer 252 may generate one or more stages and/or actions to cause the moveable surfaces 134,136 of the FWT apparatus 154,156 to move to the desired position from the current position of the moveable surfaces 134,136.

The sequence and control module 250 of FIGS. 2A and 2B includes the status evaluator 256 to evaluate a status of a component and/or a system of an FWT apparatus. For example, the status evaluator 256 may evaluate a status of a component and/or a system of the FWT apparatus 154,156 of FIG. 1. In some examples, the status evaluator 256 obtains a status of a component from the database 270. For example, the status evaluator 256 may obtain a status of a pneumatic actuator of the FWT apparatus 154 from the database 270. The status evaluator 256 may evaluate the status of the pneumatic actuator and determine whether the status is normal operation or non-responsive. In some instances, the status evaluator 256 obtains a status of a system. For example, the status evaluator 256 may obtain a status of a pneumatic system of the FWT apparatus 154. The status evaluator 256 may evaluate the status of the pneumatic system and determine whether the status is normal operation or non-responsive.

The sequence and control module 250 of FIGS. 2A and 2B includes the FWT controller 258 to control a component and/or a system of an FWT apparatus. For example, the FWT controller 258 may control a component and/or a system of the FWT apparatus 154,156 of FIG. 1. In some examples, the FWT controller 258 generates a command. For example, the FWT controller 258 may generate a command for the FWT apparatus 154 to move the moveable surface 134 of FIG. 1 from the folded position 146 to the extended position 142. In some examples, the FWT controller 258 generates the command to engage an interlock. For example, the FWT controller 258 may generate the command to engage a mechanical interlock and/or a software interlock. In some instances, the FWT controller 258 generates the command to engage the interlock based on the status of the component and/or the system. In some examples, the FWT controller 258 transmits a command to a remote electronics unit. For example, the FWT controller 258 may transmit a command to the REUs 168,170 of FIG. 1.

In some examples, the FWT controller 258 executes a sequence of commands in accordance with the FWT stages and/or the FWT actions generated by the FWT normal operation sequencer 252 or the FWT non-responsive sequencer 254. In some examples, the FWT controller 258 executes the sequence of commands to complete one or more FWT actions based on a status of a component and/or a system. For example, the FWT controller 258 may issue a first command to a first component of the FWT apparatus 154 to execute a first FWT action within a first FWT stage. The FWT controller 258 may receive the status of the first component indicating that the first command was executed and completed successfully. The FWT controller 258 may determine that the first FWT action is complete based on the status of the first component. In response to determining that the first FWT action is complete, the FWT controller 258 may issue a second command to a second component of the FWT apparatus 154,156 to execute a second FWT action within the first FWT stage.

In some examples, the FWT controller 258 executes a sequence of commands to complete one or more FWT stages based on a status of a component and/or a system. For example, the FWT controller 258 may issue a first command to a component of the FWT apparatus 154,156 to execute a first FWT action within a first FWT stage. The FWT controller 258 may receive a status of the component indicating that the first command was executed and completed successfully. The FWT controller 258 may determine that the first FWT action is complete based on the component status. The FWT controller 258 may also determine that the first FWT stage is complete based on the completion of the first FWT action. In response to determining that the first FWT stage is complete, the FWT controller 258 may issue a second command to a component of the FWT apparatus 154,156 to execute a first FWT action within a second FWT stage. In some examples, the FWT controller 258 sets a flag (e.g., a completion flag) when the FWT stage and/or the FWT action is complete.

The gatekeeper module 280 of FIGS. 2A and 2B includes an example command interceptor 282, an example FWT apparatus analyzer 284, an example flight stage analyzer 286, an example maintenance enabler 288, an example safety interlocker 290, and an example command transmitter 292. The gatekeeper module 280 includes the command interceptor 282 to obtain or intercept a command issued from the sequence and control module 250. In some examples, the command interceptor 282 obtains the command from the database 270. For example, the sequence and control module 250 may issue the command and store the command in the database 270. The command interceptor 282 may obtain the stored command from the database 270.

The gatekeeper module 280 of FIGS. 2A and 2B includes the FWT apparatus analyzer 284 to analyze an FWT apparatus and generate one or more rules based on a status of a component and/or a system of the FWT apparatus. For example, the FWT apparatus analyzer 284 may generate one or more FWT apparatus or status rules based on a status of the component and/or a system of the FWT apparatus 154,156 of FIG. 1. A first example FWT apparatus rule may include not sending a command to a component and/or a system that has a non-responsive status. Thus, sending a command to a component that has a non-responsive status violates the first example FWT apparatus rule. A second example FWT apparatus rule may include not sending a command to a component and/or a system that is not enabled. Thus, sending a command to a component and/or a system that is not enabled violates the second example FWT apparatus rule.

A third example FWT apparatus rule may include not sending a command to a component and/or a system that is incompatible with a status of the component and/or the system. A fourth example FWT apparatus rule may include not sending a command to a first component and/or a first system that is incompatible with a status of a second component and/or a second system, where the first component and the first system are related to the second component and the second system. For example, a primary lock of the FWT apparatus 154 is in the locked position and the moveable surface 134 is in the extended position 142. The outgoing electronic command may be to adjust the moveable surface 134 to the folded position 146. The FWT apparatus analyzer 284 may determine that adjusting the moveable surface 134 to the folded position 146 is incompatible with the primary lock being in the locked position. Thus, the FWT apparatus analyzer 284 may determine that the outgoing electronic command is a violation of the fourth example FWT apparatus rule.

In some examples, the FWT apparatus analyzer 284 regenerates the FWT apparatus rules every process control cycle of the FWT control modules 158,160. In some instances, the FWT apparatus rule may be retrieved from the database 270. For example, the FWT apparatus analyzer 284 may retrieve the FWT apparatus rule from the database 270 at the beginning of the process control cycle. In some examples, the FWT apparatus analyzer 284 may store the FWT apparatus rule in the database 270. For example, the FWT apparatus analyzer 284 may store the FWT apparatus rule in the database 270 at the end of the process control cycle.

The gatekeeper module 280 of FIGS. 2A and 2B includes the flight stage analyzer 286 to analyze flight stage information of an aircraft and generate one or more rules based on the flight stage information. For example, the flight stage analyzer 286 may generate one or more flight stage rules based on the flight stage of the aircraft 100 of FIG. 1. A first example flight stage rule may include not actuating a component and/or a system when the flight stage indicates that the aircraft is in flight. For example, moving the moveable surface 134 of FIG. 1 from the extended position 142 to the folded position 146 while the flight stage indicates that the aircraft is in flight is a violation of the first example flight stage rule. A second example flight stage rule may include not actuating a component and/or a system when the flight stage indicates that the aircraft is docked at an airport gate. For example, moving the moveable surface 134 from the folded position 146 to the extended position 142 while the flight stage indicates that the aircraft is docked at the airport gate is a violation of the second example flight stage rule.

In some examples, the flight stage analyzer 286 regenerates the flight stage rules every process control cycle of the FWT control modules 158,160. In some instances, the flight stage rule may be retrieved from the database 270. For example, the flight stage analyzer 286 may retrieve the flight stage rule from the database 270 at the beginning of the process control cycle. In some examples, the flight stage analyzer 286 may store the FWT apparatus rule in the database 270. For example, the flight stage analyzer 286 may store the flight stage rule in the database 270 at the end of the process control cycle.

The gatekeeper module 280 of FIGS. 2A and 2B includes the maintenance enabler 288 to enable a maintenance mode of an FWT control module. For example, the maintenance enabler 288 may enable the maintenance mode(s) of the FWT apparatus 154,156 of FIG. 1. In some examples, maintenance personnel operate the FWT apparatus 154,156 in a maintenance mode(s) or test mode(s) to perform component checks and/or system checks. For example, the maintenance personnel may enable the maintenance mode by actuating a button, a knob, a switch, etc. accessible by the maintenance personnel. The button, the knob, the switch, etc. may set a flag and/or an alert within the maintenance enabler 288. The maintenance enabler 288 may allow the maintenance personnel to operate individual components and/or individual systems of the FWT apparatus 154,156. For example, the maintenance enabler 288 may allow the maintenance personnel to output custom outgoing electronic commands to the components and/or the systems of the FWT apparatus 154,156.

In the illustrated example of FIGS. 2A and 2B, the gatekeeper module 280 includes the safety interlocker 290 to provide valid output electronic commands to the FWT apparatus 154,156. In some examples, the safety interlocker 290 engages a safety interlock (e.g., a mechanical interlock, a software interlock, etc.) by modifying the outgoing electronic command. In some instances, the safety interlock prevents an action from occurring (e.g., canceling a command, dropping a command, etc.) or altering the action (e.g., modifying the command). In some instances, the outgoing electronic command is obtained from the database 270. For example, the sequence and control module 250 may generate a command and store the command in the database 270. The safety interlocker 290 may obtain the command from the database 270 and determine if the command is valid.

In some examples, the safety interlocker 290 modifies the outgoing electronic command based on a violation of the rules generated and/or evaluated by the FWT apparatus analyzer 284, the flight stage analyzer 286, etc. For example, a hydraulic actuation system may not be enabled and the moveable surfaces 134,136 of FIG. 1 are in the extended position 142. The outgoing electronic command may be to control the hydraulic actuation system to adjust the moveable surfaces 134,136 from the extended positions 142,144 to the folded positions 146,148. In response to determining that the hydraulic actuation system is not enabled, the FWT apparatus analyzer 284 may determine that the outgoing electronic command violated an FWT apparatus rule. In response to the violation of the FWT apparatus rule, the safety interlocker 290 may modify the outgoing electronic command to provide a valid command to the component of the FWT apparatus 154,156. For example, the safety interlocker 290 may modify the outputs 298 of the FWT control modules 158,160 to provide the valid command to the component of the FWT apparatus 154,156.

In some examples, the safety interlocker 290 may modify the outgoing electronic command by replacing a value of the outgoing electronic command with a zero value or a null character. In some instances, the safety interlocker 290 may modify the outgoing electronic command by replacing the value of the outgoing electronic command with a stored default value. For example, the safety interlocker 290 may replace the value of the outgoing electronic command with the stored default value obtained from the database 270 via the network 294. In some instances, the safety interlocker 290 may set a flag (e.g., a rules violation flag, an invalid input flag, an alert flag, etc.) alerting the FWT control modules 158,160 that the outgoing electronic command is invalid. For example, the safety interlocker 290 may set a rules violation flag when the outgoing electronic command violates one or more rules generated by the FWT apparatus analyzer 284, the flight stage analyzer 286, etc.

In some examples, the gatekeeper module 280 of FIGS. 2A and 2B may include the safety interlocker 290 to modify the outgoing electronic command to an aircraft control surface. For example, the safety interlocker 290 may modify the outgoing electronic command to the aircraft control surface by replacing a value of the outgoing electronic command with a zero value or a null character. In some instances, the safety interlocker 290 may modify the outgoing electronic command by replacing the value of the outgoing electronic command to the aircraft control surface with a stored default value. For example, the safety interlocker 290 may replace the value of the outgoing electronic command to the aircraft control surface with the stored default value obtained from the database 270 via the network 294. In some instances, the safety interlocker 290 may set a flag (e.g., a rules violation flag, an invalid input flag, an invalid output flag, an alert flag, etc.) alerting the FWT control modules 158,160 or an aircraft process control system that the outgoing electronic command is invalid.

The gatekeeper module 280 of FIGS. 2A and 2B includes the command transmitter 292 to output a command generated and/or processed from the FWT control modules 158, 160. In some examples, the command transmitter 292 outputs a modified command or a modified command. For example, the command transmitter 292 may transmit the modified command or the unmodified command as the output 298. In some examples, the command transmitter 292 transmits the command to a remote electronics unit (REU). For example, the command transmitter 292 may transmit the command to the REUs 168,170 of FIG. 1. In some examples, the FWT control modules 158,160 control a component and/or a system of an FWT apparatus connected to the REUs 168,170 via the command transmitter 292. For example, the command transmitter 292 may relay or transmit the command generated by the FWT controller 258 to the REUs 168,170.

While an example manner of implementing the example FWT control modules 158,160 of FIG. 1 are illustrated in FIGS. 2A and 2B, one or more of the elements, processes and/or devices illustrated in FIGS. 2A and 2B may be combined, divided, re-arranged, omitted, eliminated and/or implemented in any other way. Further, the example collection module 200, the example network interface 202, the example sensor interface 204, the example information processor 206, the example information validator 208, the example detection module 210, the example flight deck input detector 212, the example flight stage detector 214, the example FWT status detector 216, the example FWT detent detector 218, the example FWT lock detector 220, the example enable system module 230, the example FWT apparatus enabler 232, the example FWT apparatus actuator system enabler 234, the example REU enabler 236, the example component enabler 238, the example monitor and annunciation module 240, the example non-responsive status classifier 242, the example alert generator 244, the example alert manager 246, the example user interface information provider 248, the example sequence and control module 250, the example FWT normal operation sequencer 252, the example FWT non-responsive sequencer 254, the example status evaluator 256, the example FWT controller 258, the example database 270, the example gatekeeper module 280, the example command interceptor 282, the example FWT apparatus analyzer 284, the example flight stage analyzer 286, the example maintenance enabler 288, the example safety interlocker 290, the example command transmitter 292, and/or, more generally, the example FWT control modules 158,160 of FIGS. 2A and 2B may be implemented by hardware, software, firmware and/or any combination of hardware, software and/or firmware. Thus, for example, any of the example collection module 200, the example network interface 202, the example sensor interface 204, the example information processor 206, the example information validator 208, the example detection module 210, the example flight deck input detector 212, the example flight stage detector 214, the example FWT status detector 216, the example FWT detent detector 218, the example FWT lock detector 220, the example enable system module 230, the example FWT apparatus enabler 232, the example FWT apparatus actuator system enabler 234, the example REU enabler 236, the example component enabler 238, the example monitor and annunciation module 240, the example non-responsive status classifier 242, the example alert generator 244, the example alert manager 246, the example user interface information provider 248, the example sequence and control module 250, the example FWT normal operation sequencer 252, the example FWT non-responsive sequencer 254, the example status evaluator 256, the example FWT controller 258, the example database 270, the example gatekeeper module 280, the example command interceptor 282, the example FWT apparatus analyzer 284, the example flight stage analyzer 286, the example maintenance enabler 288, the example safety interlocker 290, the example command transmitter 292, and/or, more generally, the example FWT control modules 158,160 of FIGS. 2A and 2B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection module 200, the example network interface 202, the example sensor interface 204, the example information processor 206, the example information validator 208, the example detection module 210, the example flight deck input detector 212, the example flight stage detector 214, the example FWT status detector 216, the example FWT detent detector 218, the example FWT lock detector 220, the example enable system module 230, the example FWT apparatus enabler 232, the example FWT apparatus actuator system enabler 234, the example REU enabler 236, the example component enabler 238, the example monitor and annunciation module 240, the example non-responsive status classifier 242, the example alert generator 244, the example alert manager 246, the example user interface information provider 248, the example sequence and control module 250, the example FWT normal operation sequencer 252, the example FWT non-responsive sequencer 254, the example status evaluator 256, the example FWT controller 258, the example database 270, the example gatekeeper module 280, the example command interceptor 282, the example FWT apparatus analyzer 284, the example flight stage analyzer 286, the example maintenance enabler 288, the example safety interlocker 290, the example command transmitter 292, and/or, more generally, the example FWT control modules 158,160 of FIGS. 2A and 2B is/are hereby expressly defined to include a tangible computer readable storage device or storage disk such as a memory, a digital versatile disk (DVD), a compact disk (CD), a Blu-ray disk, etc. storing the software and/or firmware. Further still, the example FWT control modules 158,160 of FIGS. 2A and 2B may include one or more elements, processes and/or devices in addition to, or instead of, those illustrated in FIGS. 2A and 2B, and/or may include more than one of any or all of the illustrated elements, processes and devices.

Flowcharts representative of example methods for implementing the example FWT control modules 158,160 of FIGS. 2A and 2B are shown in FIGS. 3-12. In these examples, the methods may be implemented using machine readable instructions that comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 3-12, many other methods of implementing the example FWT control modules 158,160 may alternatively be used. For example, the order of execution of the blocks may be changed, and/or some of the blocks described may be changed, eliminated, or combined.

As mentioned above, the example methods of FIGS. 3-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 3:
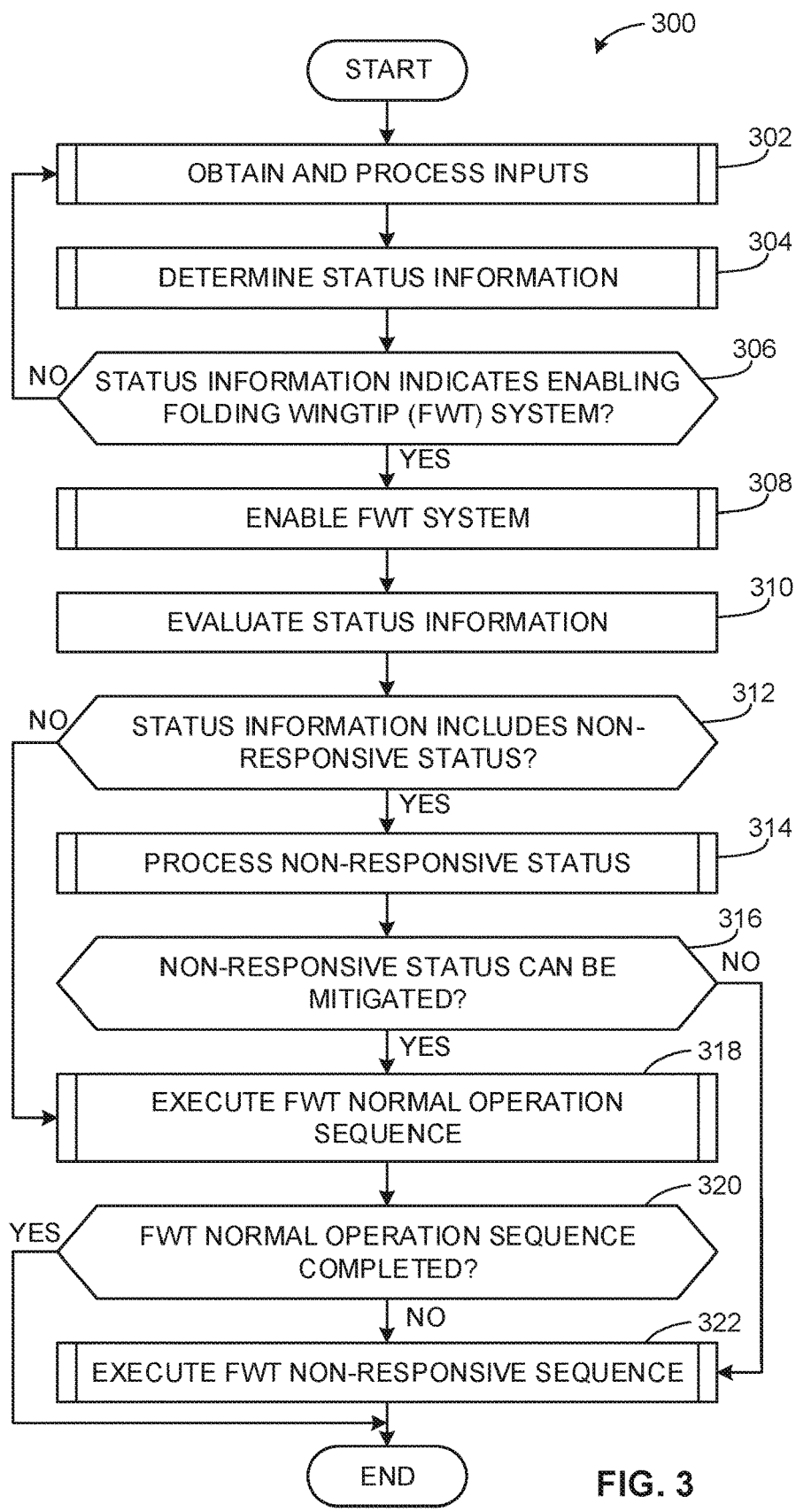
FIGS. 3-12 are flowcharts representative of example methods that may be used to implement the example folding wingtip control module apparatus of FIGS. 2A and 2B.

FIG. 3 is a flowchart representative of an example method 300 that may be performed by the example FWT control modules 158,160 of FIGS. 2A and 2B to determine and execute an FWT sequence of events to control the FWT apparatus 154,156 of FIG. 1. For example, the FWT control modules 158,160 may determine whether to execute a normal operation FWT sequence of events or a non-responsive FWT sequence of events. The example method 300 begins at block 302 when the FWT control modules 158,160 obtain and process inputs from an aircraft process control system. For example, the collection module 200 may obtain and process the inputs 296. At block 304, the FWT control modules 158,160 determine status information corresponding to the FWT apparatus, and, more generally, the aircraft process control system. For example, the detection module 210 may detect and/or determine status information of the FWT apparatus 154,156 and the aircraft 100.

At block 306, the FWT control modules 158,160 determine whether to enable the FWT system. For example, the enable system module 230 may determine whether determined status information indicates enabling the FWT apparatus 154,156. If, at block 306, the FWT control modules 158,160 determine not to enable the FWT system, then control returns to block 302 to obtain and process additional inputs. For example, the status information of the FWT apparatus 154,156 may not indicate that the FWT system is to be enabled. If, at block 306, the FWT control modules 158,160 determine to enable the FWT system, then, at block 308, the FWT control modules 158,160 enable the FWT system. For example, the status information of the FWT apparatus 154,156 may indicate that the FWT system is to be enabled.

At block 308, the FWT control modules 158,160 enable the FWT system. For example, the enable system module 230 enables the FWT system. At block 310, the FWT control modules 158,160 evaluate the status information. For example, the sequence and control module 250 may evaluate the status information. At block 312, the FWT control modules 158,160 determine whether the status information includes a non-responsive status. For example, the sequence and control module 250 may determine whether the status information includes a non-responsive status. If, at block 312, the FWT control modules 158,160 determine that the status information does not include a non-responsive status, then, at block 318, the FWT control modules 158,160 execute an FWT normal operation sequence for the FWT apparatus 154,156. If, at block 312, the FWT control modules 158,160 determine that the status information includes a non-responsive status, then, at block 314, the FWT control modules 158,160 process the non-responsive status.

At block 314, the FWT control modules 158,160 process the non-responsive status. For example, the monitor and annunciation module 240 may process the non-responsive status. At block 316, the FWT control modules 158,160 determine whether the non-responsive status can be mitigated. For example, the monitor and annunciation module 240 may determine whether the non-responsive status can be mitigated. If, at block 316, the FWT control modules 158, 160 determine that the non-responsive status can be mitigated, then, at block 318, the FWT control modules 158,160 execute a normal operation sequence. If, at block 316, the FWT control modules 158,160 determine that the non-responsive status cannot be mitigated, control proceeds to block 322 to execute an FWT non-responsive sequence.

At block 318, the FWT control modules 158,160 execute the FWT normal operation sequence. For example, the sequence and control module 250 may generate and execute an FWT normal operation sequence, where the FWT normal operation sequence may include one or more FWT stages and/or FWT actions. At block 320, the FWT control modules 158,160 determine whether the FWT normal operation sequence completed. For example, the sequence and control module 250 may determine whether the FWT normal operation sequence completed. If, at block 320, the FWT control modules 158,160 determine that the FWT normal operation sequence did not complete, then, at block 322, the FWT control modules 158,160 execute the FWT non-responsive sequence. For example, the sequence and control module 250 may generate and execute an FWT non-responsive sequence, where the FWT non-responsive sequence may include one or more FWT stages and/or FWT actions. If, at block 320, the FWT control modules 158,160 determine that the FWT normal operation sequence completed, then the example method 300 concludes.

Figure 4:
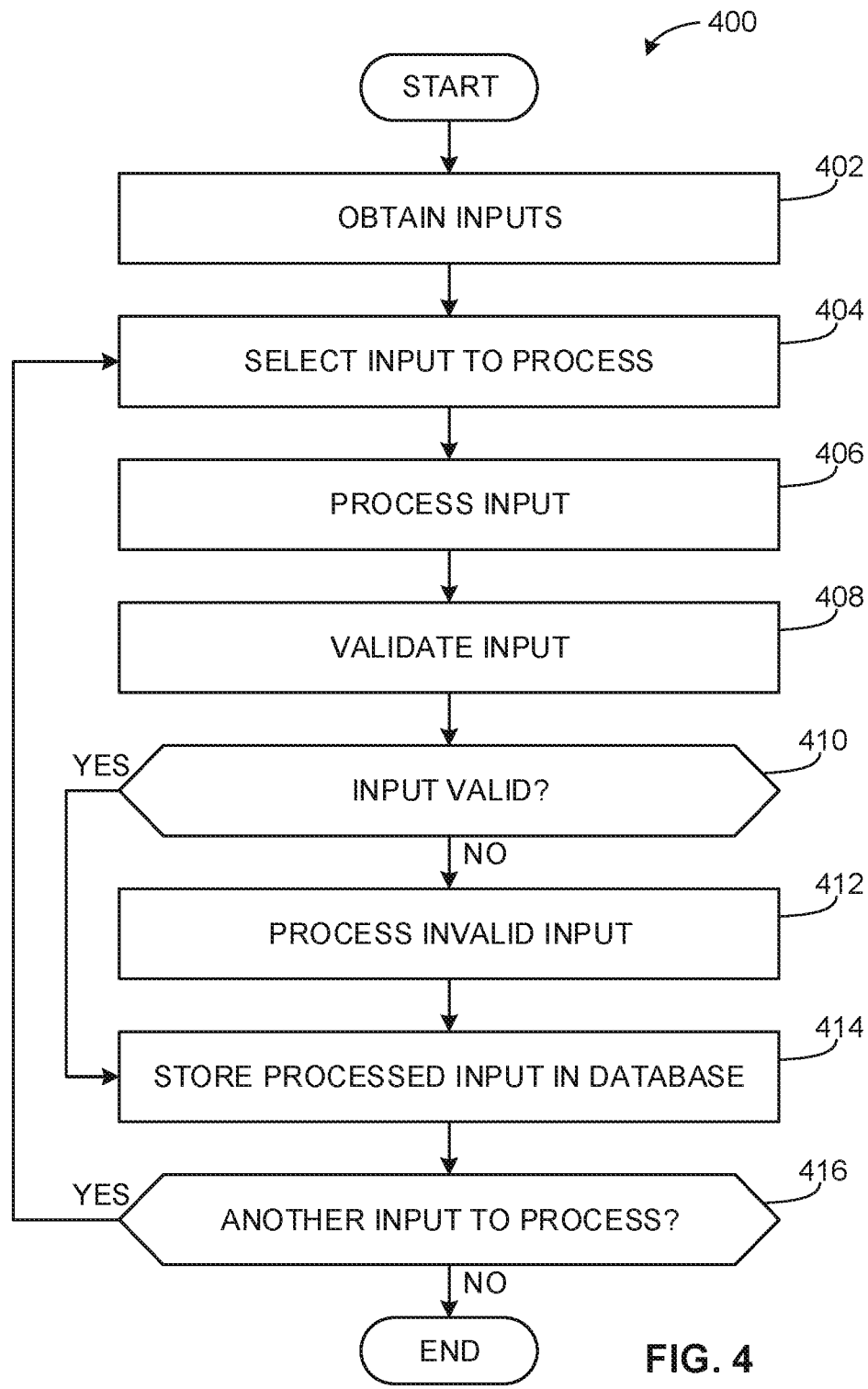

Additional detail in connection with obtaining and processing inputs (FIG. 3 block 302) is shown in FIG. 4. FIG. 4 is a flowchart representative of an example method 400 that may be performed by the FWT control modules 158,160 of FIGS. 2A and 2B to obtain and process inputs. The example method 400 begins at block 402 when the collection module 200 obtains inputs. For example, the collection module 200 may obtain the inputs 296 via the network interface 202 or the sensor interface 204. At block 404, the collection module 200 selects an input to process. For example, the information processor 206 may select an input 296 to process. At block 406, the collection module 200 processes the input. For example, the information processor 206 may process the input 296 by converting (e.g., converting using a conversion calculation, converting to different units of measure, etc.), scaling (e.g., scaling using a scaling factor), and/or translating (e.g., translating using a pre-determined curve, translating using a pre-determined equation) the value of the input 296.

At block 408, the collection module 200 validates the input. For example, the information validator 208 may validate the input 296. At block 410, the collection module 200 determines whether the input is valid. For example, the information validator 208 may determine whether the input 296 is valid. If, at block 410, the collection module 200 determines that the input is valid, then, at block 414, the collection module 200 stores the processed input in a database. For example, the information validator 208 may store the input 296 in the database 270 in response to determining that the input 296 is valid. If, at block 410, the collection module 200 determines that the input is invalid, control proceeds to block 412 to process the invalid input. At block 412, the collection module 200 processes the invalid input. For example, the information validator 208 may determine that the input 296 has a value that is out of the range of acceptable values for the input 296 and, in response, determines that the input 296 is invalid. At block 414, the collection module 200 stores the processed input in a database. For example, the information validator 208 may store the input 296 in the database 270. At block 416, the collection module 200 determines whether there is another input to process. If, at block 416, the collection module 200 determines there is another input to process, control returns to block 404 to select another input to process, otherwise the example method 400 concludes.

Figure 5:
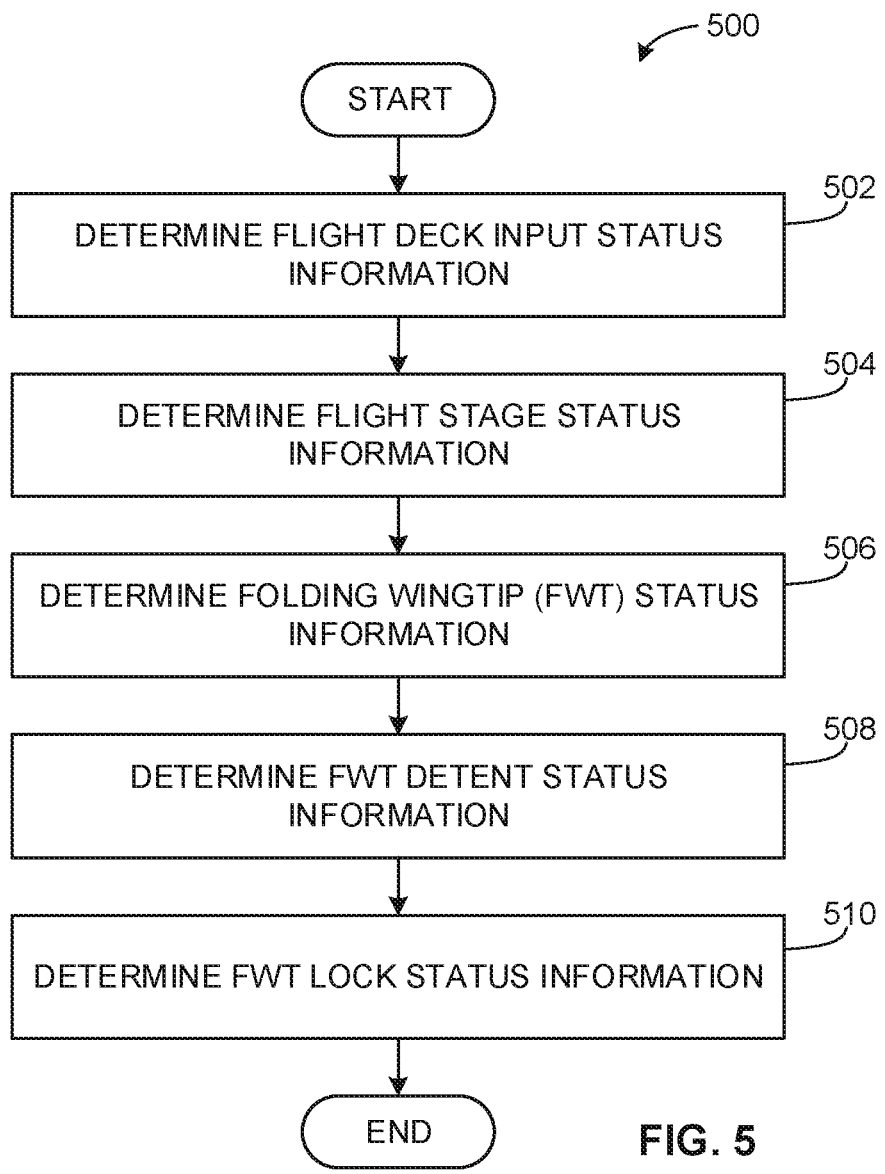

Additional detail in connection with determining status information (FIG. 3 block 304) is shown in FIG. 5. FIG. 5 is a flowchart representative of an example method 500 that may be performed by the FWT control modules 158,160 of FIGS. 2A and 2B to determine status information of an FWT apparatus, and, more generally an aircraft process control system. The example method 500 begins at block 502 when the FWT control modules 158,160 detect and determine flight deck input status information. For example, the flight deck input detector 212 may determine a status of a flight deck input from a cockpit or a flight deck of an aircraft. At block 504, the FWT control modules 158,160 determine flight stage status information. For example, the flight stage detector 214 may determine a status of a flight stage of the aircraft. At block 506, the FWT control modules 158,160 determine folding wingtip (FWT) status information. For example, the FWT status detector may determine a status or statuses of the FWT apparatus 154,156 of FIG. 1. At block 508, the FWT control modules 158,160 determine FWT detent status information. For example, the FWT detent detector 218 may determine a status of a latch or an additional locking mechanism of the FWT apparatus 154, 156. At block 510, the FWT control modules 158,160 determine FWT lock status information. For example, the FWT lock detector 220 may determine a status of a primary lock, a secondary lock, etc. of the FWT apparatus 154,156.

Figure 6:
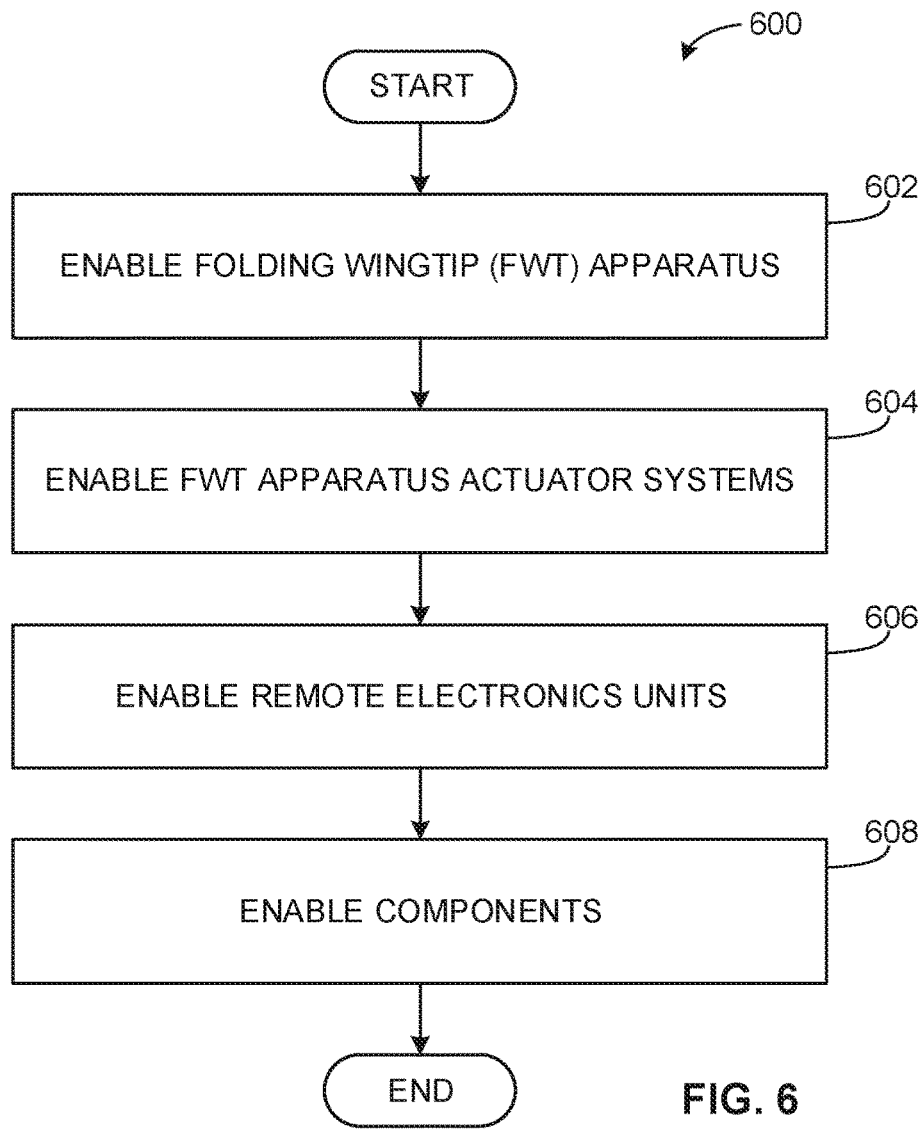

Additional detail in connection with enabling the FWT system (FIG. 3 block 308) is shown in FIG. 6. FIG. 6 is a flowchart representative of an example method 600 that may be performed by the FWT control modules 158,160 of FIGS. 2A and 2B to enable the FWT system. The example method 600 begins at block 602 when the FWT control modules 158,160 enable an FWT apparatus. For example, the FWT apparatus enabler 232 may set a flag (e.g., an enable FWT apparatus flag) for the FWT apparatus 154,156 alerting the FWT control modules 158,160 that the FWT apparatus 154,156 are enabled. At block 604, the FWT control modules 158,160 enable one or more FWT apparatus actuator systems. For example, the FWT apparatus actuator system enabler 234 may set a flag (e.g., an enable FWT apparatus actuator system flag) for an FWT apparatus actuator system of the FWT apparatus 154,156, alerting the FWT control modules 158,160 that the FWT apparatus actuator system is enabled.

At block 606, the FWT control modules 158,160 enable one or more remote electronics units (REUs). For example, the REU enabler 236 may set a flag (e.g., an enable REU flag) for the REUs 168,170 of FIG. 1, alerting the FWT control modules 158,160 that the REUs 168,170 are enabled. At block 608, the FWT control modules 158,160 enable one or more components. For example, the component enabler 238 may set a flag (e.g., an enable component flag) for one or more components of the FWT apparatus 154,156 alerting the FWT control modules 158,160 that the one or more components are enabled.

Figure 7:
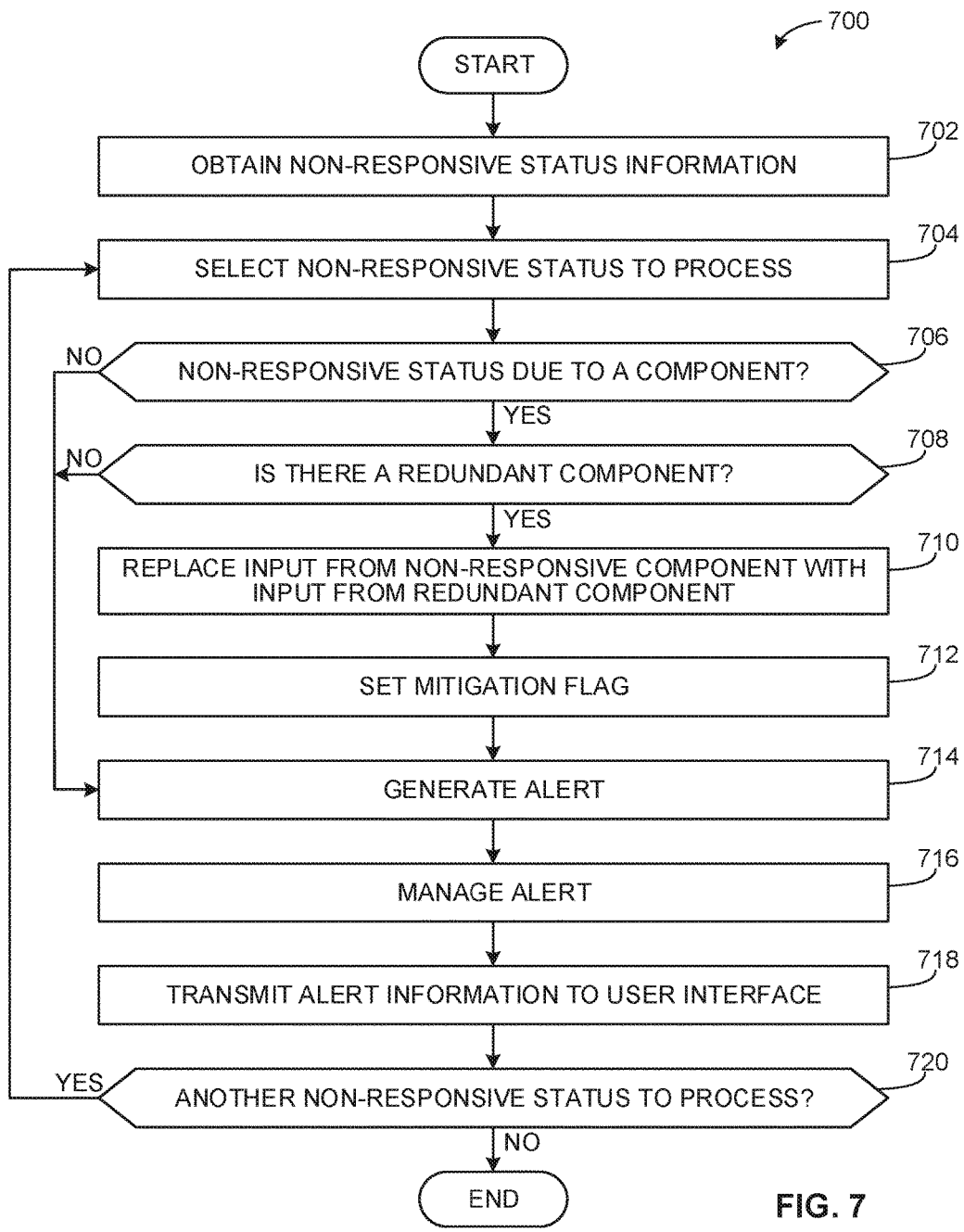

Additional detail in connection with processing non-responsive statuses (FIG. 3 block 314) is shown in FIG. 7. FIG. 7 is a flowchart representative of an example method 700 that may be performed by the FWT control modules 158,160 of FIGS. 2A and 2B to process a non-responsive status. The example method 700 begins at block 702 when the FWT control modules 158,160 obtain non-responsive status information. For example, the non-responsive status classifier 242 may obtain the non-responsive status information from the database 270. At block 704, the FWT control modules 158,160 select a non-responsive status to process. For example, the non-responsive status classifier 242 may select the non-responsive status to process.

At block 706, the FWT control modules 158,160 determine whether the non-responsive status is due to a component. For example, the non-responsive status classifier 242 may determine whether the non-responsive status is due to a component status. If, at block 706, the FWT control modules 158,160 determine that the non-responsive status is not due to the component, control proceeds to block 714 to generate an alert. If, at block 706, the FWT control modules 158,160 determine that the non-responsive status is due to the component, then, at block 708, the FWT control modules 158,160 determine whether there is a redundant component. For example, the non-responsive status classifier 242 may determine whether the component has one or more backup or redundant components in response to the component having a non-responsive status. If, at block 708, the FWT control modules 158,160 determine that there is not a redundant component, control proceeds to block 714 to generate an alert. If, at block 708, the FWT control modules 158,160 determine that there is a redundant component, then, at block 710, the FWT control modules 158,160 replace an input from the non-responsive component with an input from the redundant component. For example, the non-responsive status classifier 242 may set a flag (e.g., a redundant component flag), alerting the FWT control modules 158,160 to disable the non-responsive component data channel and enable the redundant component data channel. For example, the collection module 200 may disable the non-responsive component data channel and enable the redundant component data channel.

At block 712, the FWT control modules 158,160 set a mitigation flag. For example, the non-responsive status classifier 242 may set the mitigation flag, alerting the FWT control modules 158,160 that the component with the non-responsive status may be mitigated. At block 714, the FWT control modules 158,160 generate an alert. For example, the alert generator 244 may generate an alert such as, for example, displaying an alert on a user interface, propagating an alert message throughout a process control network, generating an alert log and/or a report, etc. At block 716, the FWT control modules 158,160 manage the alert. For example, the alert manager 246 may process the generated alert by adding the alert in an alert list, an alert log, an alert report, etc. At block 718, the FWT control modules 158,160 transmit the alert information (e.g., the alert list, the alert log, the alert report, etc.) to a user interface. For example, the user interface information provider 248 may assign information related to generated alerts to variables associated with an FWT apparatus user interface. At block 720, the FWT control modules 158,160 determine whether there is another non-responsive status to process. If, at block 720, the FWT control modules 158,160 determine there is another non-responsive status to process, control returns to block 704 to select another non-responsive status to process, otherwise the example method 700 concludes.

Figure 8:
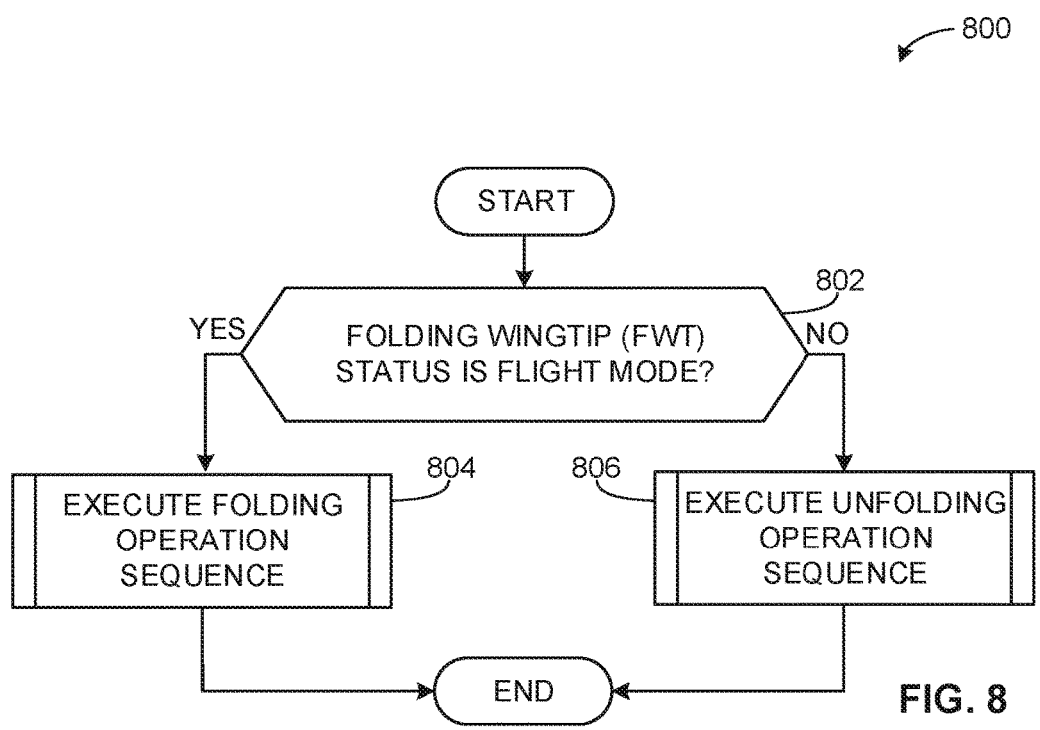

Additional detail in connection with executing an FWT normal operation sequence (FIG. 3 block 318) is shown in FIG. 8. FIG. 8 is a flowchart representative of an example method 800 that may be performed by the FWT control modules 158,160 of FIGS. 2A and 2B to execute the FWT normal operation sequence. The example method 800 begins at block 802 when the FWT control modules 158,160 determine whether the FWT status is flight mode. For example, the status evaluator 256 may evaluate the FWT status and determine if the FWT status is the flight mode, the folded mode, etc. If, at block 802, the FWT control modules 158,160 determine that the FWT status is the flight mode, then, at block 804, the FWT control modules 158,160 execute a folding operation sequence. For example, the FWT normal operation sequencer 252 may generate and execute an FWT normal operation sequence to automatically move the folding wingtips from the extended position to the folded position. The FWT normal operation sequence may include one or more FWT stages and/or FWT actions. If, at block 802, the FWT control modules 158,160 determine that the FWT status is not the flight mode (e.g., in folded mode) then, at block 806, the FWT control modules 158,160 execute an unfolding operation sequence. For example, the FWT normal operation sequencer 252 may generate and execute an FWT normal operation sequence to automatically move the folding wingtips from the folded position to the extended position.

Figure 9:
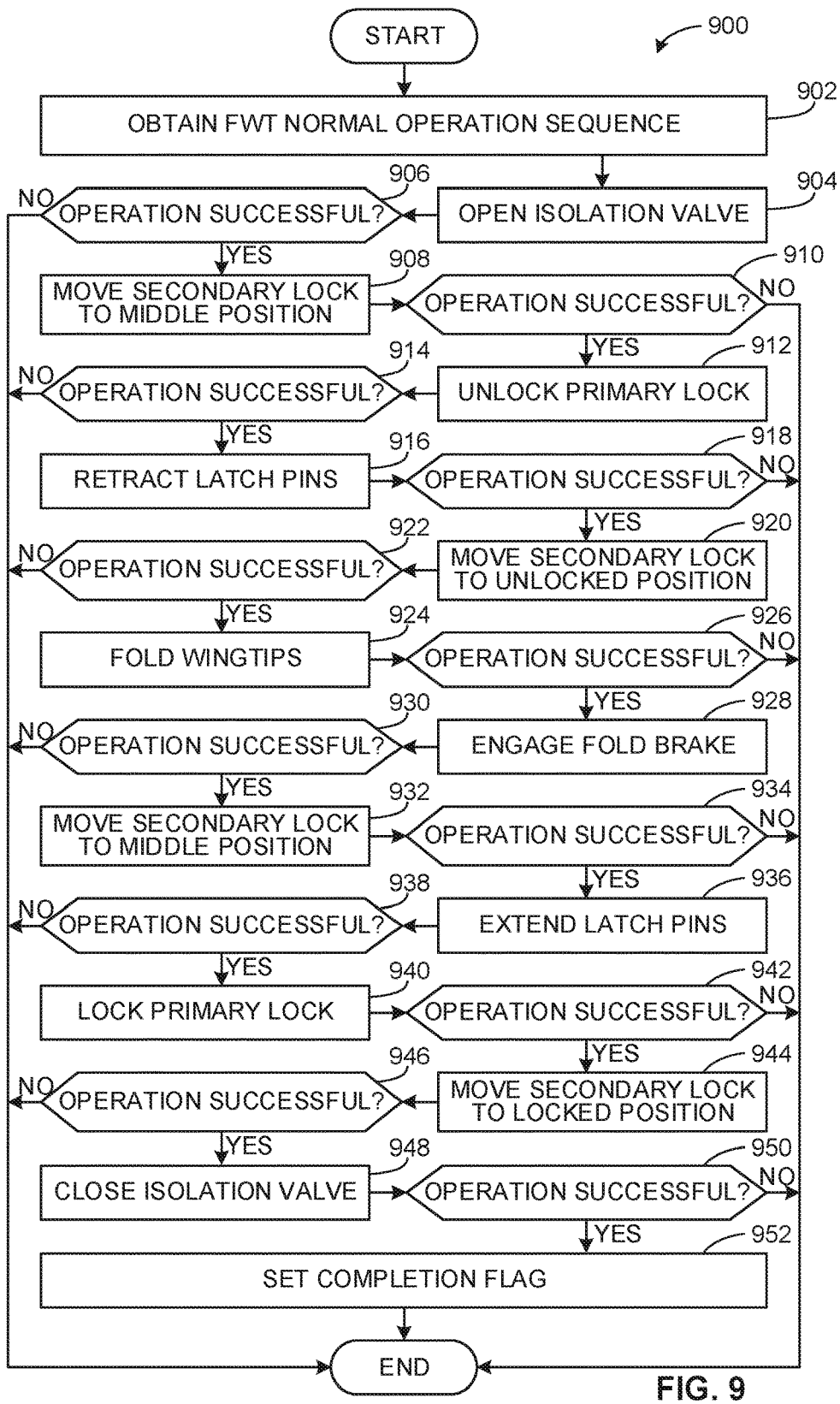

Additional detail in connection with executing an example folding operation sequence (FIG. 8 block 804) is shown in FIG. 9. FIG. 9 is a flowchart representative of an example method 900 that may be performed by the FWT control modules 158,160 of FIGS. 2A and 2B to execute the example folding operation sequence of the FWT apparatus 154,156 of FIG. 1. The example method 900 begins at block 902 when the FWT control modules 158,160 obtain an FWT normal operation sequence. For example, the FWT normal operation sequencer 252 may determine the FWT normal operation sequence. The FWT normal operation sequencer 252 may store the FWT normal operation sequence in the database 270. The FWT controller 258 may obtain the FWT normal operation sequence from the FWT normal operation sequencer 252 or from the database 270. At block 904 the FWT control modules 158,160 open an isolation valve (e.g., a hydraulic valve, a pneumatic valve, etc.). For example, the FWT controller 258 may issue a command to the REU 168 of FIG. 1 via the command transmitter 292 to open the isolation valve of the FWT apparatus 154. At block 906, the FWT control modules 158,160 determine whether the operation is successful. For example, the FWT controller 258 may determine whether the operation is successful based on a status change of the isolation valve. For example, the FWT controller 258 may determine the isolation valve status change based on a measurement of a sensor monitoring the isolation valve (e.g., a position sensor, a proximity sensor, etc.). If, at block 906, the FWT control modules 158,160 determine that the operation is successful, then, at block 908, the FWT control modules 158,160 move a secondary lock to a middle position, otherwise the example method 900 concludes.

At block 908, the FWT control modules 158,160 move the secondary lock to the middle position or an intermediate position. For example, the FWT controller 258 may issue a command to the REU 168 via the command transmitter 292 to move the secondary lock of the FWT apparatus 154 to the middle position. At block 910, the FWT control modules 158,160 determine whether the operation is successful. For example, the FWT controller 258 may determine whether the operation is successful based on a status change of the secondary lock. If, at block 910, the FWT control modules 158,160 determine that the operation is successful, then, at block 912, the FWT control modules 158,160 unlock a primary lock, otherwise the example method 900 concludes.

At block 912, the FWT control modules 158,160 unlock the primary lock. For example, the FWT controller 258 may issue a command to the REU 168 via the command transmitter 292 to unlock the primary lock of the FWT apparatus 154. At block 914, the FWT control modules 158,160 determine whether the operation is successful. For example, the FWT controller 258 may determine whether the operation is successful based on a status change of the primary lock. If, at block 914, the FWT control modules 158,160 determine that the operation is successful, then, at block 916, the FWT control modules 158,160 retract latch pins, otherwise the example method 900 concludes.

At block 916, the FWT control modules 158,160 retract the latch pins. For example, the FWT controller 258 may issue a command to the REU 168 via the command transmitter 292 to retract the latch pins of the FWT apparatus 154. At block 918, the FWT control modules 158,160 determine whether the operation is successful. For example, the FWT controller 258 may determine whether the operation is successful based on a status change of the latch pins. If, at block 918, the FWT control modules 158,160 determine that the operation is successful, then, at block 920, the FWT control modules 158,160 move the secondary lock to an unlocked position, otherwise the example method 900 concludes.

At block 920, the FWT control modules 158,160 move the secondary lock to the unlocked position. For example, the FWT controller 258 may issue a command to the REU 168 via the command transmitter 292 to move the secondary lock of the FWT apparatus 154 to the unlocked position. At block 922, the FWT control modules 158,160 determine whether the operation is successful. For example, the FWT controller 258 may determine whether the operation is successful based on the status change of the secondary lock. If, at block 922, the FWT control modules 158,160 determine that the operation is successful, then, at block 924, the FWT control modules 158,160 fold the wingtips, otherwise the example method 900 concludes.

At block 924, the FWT control modules 158,160 fold the wingtips. For example, the FWT controller 258 may issue a command to the REU 168 via the command transmitter 292 to move the moveable surface 134 of the FWT apparatus 154 from the extended position 142 to the folded position 146. At block 926, the FWT control modules 158,160 determine whether the operation is successful. For example, the FWT controller 258 may determine whether the operation is successful based on a status change of the folding wingtips. If, at block 926, the FWT control modules 158,160 determine that the operation is successful, then, at block 928 the FWT control modules 158,160 engage a fold brake, otherwise the example method 900 concludes.

At block 928, the FWT control modules 158,160 engage the fold brake. For example, the FWT controller 258 may issue a command to the REU 168 via the command transmitter 292 to engage the fold brake of the FWT apparatus 154. At block 930, the FWT control modules 158,160 determine whether the operation is successful. For example, the FWT controller 258 may determine whether the operation is successful based on a status change of the fold brake.

If, at block 930, the FWT control modules 158,160 determine that the operation is successful, then, at block 932 the FWT control modules 158,160 move the secondary lock to the middle position, otherwise the example method 900 concludes.

At block 932, the FWT control modules 158,160 move the secondary lock to the middle position or the intermediate position. For example, the FWT controller 258 may issue a command to the REU 168 via the command transmitter 292 to move the secondary lock of the FWT apparatus 154 from the unlocked position to the middle position. At block 934, the FWT control modules 158,160 determine whether the operation is successful. For example, the FWT controller 258 may determine whether the operation is successful based on the status change of the secondary lock. If, at block 934, the FWT control modules 158,160 determine that the operation is successful, then, at block 936 the FWT control modules 158,160 extend the latch pins, otherwise the example method 900 concludes.

At block 936, the FWT control modules 158,160 extend the latch pins. For example, the FWT controller 258 may issue a command to the REU 168 via the command transmitter 292 to extend the latch pins of the FWT apparatus 154. At block 938, the FWT control modules 158,160 determine whether the operation is successful. For example, the FWT controller 258 may determine whether the operation is successful based on the status change of the latch pins. If, at block 938, the FWT control modules 158,160 determine that the operation is successful, then, at block 940 the FWT control modules 158,160 lock the primary lock, otherwise the example method 900 concludes.

At block 940, the FWT control modules 158,160 lock the primary lock. For example, the FWT controller 258 may issue a command to the REU 168 via the command transmitter 292 to move the primary lock of the FWT apparatus 154 from the unlocked position to the locked position. At block 942, the FWT control modules 158,160 determine whether the operation is successful. For example, the FWT controller 258 may determine whether the operation is successful based on the status change of the primary lock. If, at block 942, the FWT control modules 158,160 determine that the operation is successful, then, at block 944 the FWT control modules 158,160 move the secondary lock to the locked position, otherwise the example method 900 concludes.

At block 944, the FWT control modules 158,160 move the secondary lock to the locked position. For example, the FWT controller 258 may issue a command to the REU 168 via the command transmitter 292 to move the secondary lock of the FWT apparatus 154 from the middle position to the locked position. At block 946, the FWT control modules 158,160 determine whether the operation is successful. For example, the FWT controller 258 may determine whether the operation is successful based on the status change of the secondary lock. If, at block 946, the FWT control modules 158,160 determine that the operation is successful, then, at block 948 the FWT control modules 158,160 close the isolation valve, otherwise the example method 900 concludes.

At block 948, the FWT control modules 158,160 close the isolation valve. For example, the FWT controller 258 may issue a command to the REU 168 via the command transmitter 292 to close the isolation valve of the FWT apparatus 154. At block 950, the FWT control modules 158,160 determine whether the operation is successful. For example, the FWT controller 258 may determine whether the operation is successful based on the status change of the isolation valve. If, at block 950, the FWT control modules 158,160 determine that the operation is successful, then, at block 952 the FWT control modules 158,160 set a completion flag, otherwise the example method 900 concludes.

Figure 10:
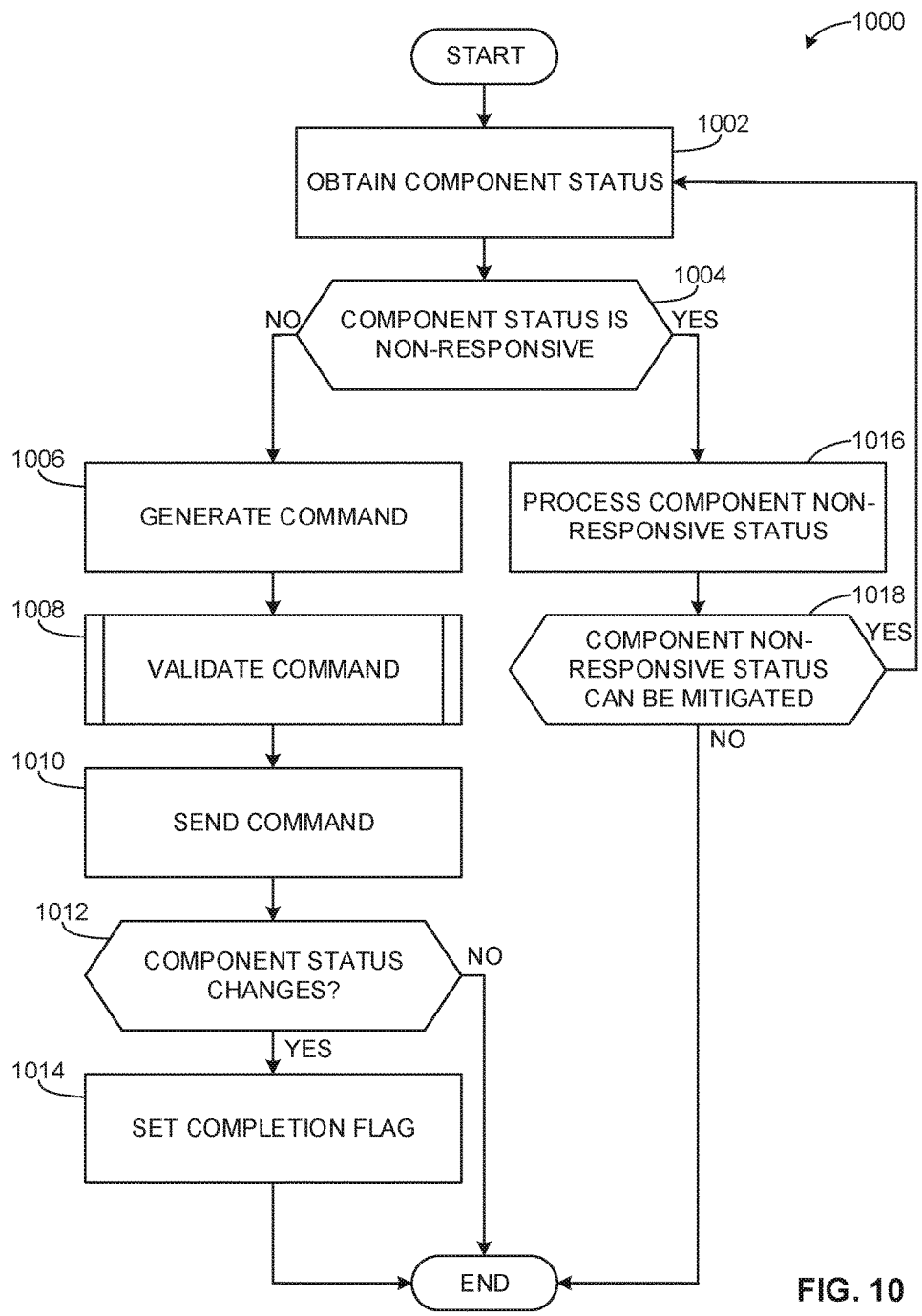

Additional detail in connection with opening an isolation valve (FIG. 9 block 904) is shown in FIG. 10. FIG. 10 is a flowchart representative of an example method 1000 that may be performed by the FWT control modules 158,160 of FIGS. 2A and 2B to actuate a component of the FWT apparatus 154,156 of FIG. 1. The example method 1000 may also be applied to the actions described in FIG. 9 blocks 904, 908, 912, 916, 920, 924, 928, 932, 936, 940, 944, and 948. The example method 1000 begins at block 1002 when the FWT control modules 158,160 obtain the component status. For example, the status evaluator 256 may obtain the isolation valve status from the database 270. At block 1004, the FWT control modules 158,160 determine whether the component status is non-responsive. For example, the status evaluator 256 may determine whether the isolation valve status is non-responsive. If, at block 1004, the FWT control modules 158,160 determine that the component is responsive, then, at block 1006, the FWT control modules 158,160 generate a command. For example, the FWT controller 258 may generate a command.

At block 1008, the FWT control modules 158,160 validate the command. For example, the gatekeeper module 280 may validate the command. At block 1010, the FWT control modules 158,160 sends the command. For example, the command transmitter 292 may send the command to the REU 168 of FIG. 1. At block 1012, the FWT control modules 158,160 determine whether the component status changes. For example, the status evaluator 256 may determine whether the isolation valve opens based on a status change of the isolation valve. If, at block 1012, the FWT control modules 158,160 determine that the component status changes, then, at block 1012, the FWT control modules 158,160 set a completion flag, otherwise the example method 1000 concludes.

For example, the FWT controller 258 may set the completion flag.

If, at block 1004, the FWT control modules 158,160 determine that the component status is non-responsive, then, at block 1014, the FWT control modules 158,160 process the component non-responsive status. For example, the FWT control modules 158,160 may process the component non-responsive status in accordance with the example method 700 as described in FIG. 7. At block 1016, the FWT control modules 158,160 determine whether the component non-responsive status can be mitigated. For example, the non-responsive status classifier 242 may determine whether the isolation valve non-responsive status can be mitigated based on whether a flag has been set (e.g., a mitigation flag has been set). If, at block 1016, the FWT control modules 158,160 determine that the component non-responsive status can be mitigated, control returns to block 1002 to obtain the component status (e.g., obtain an updated component status), otherwise the example method 1000 concludes.

Figure 11:
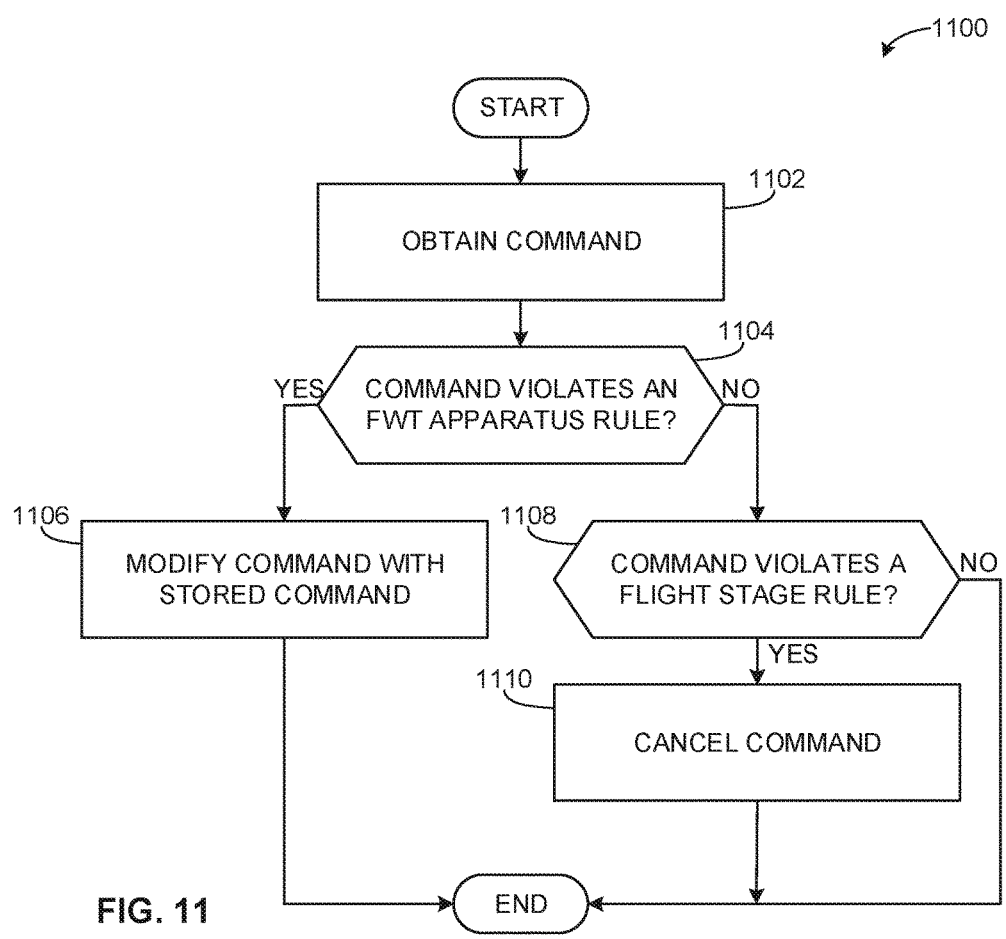

Additional detail in connection with validating the command (FIG. 10 block 1008) is shown in FIG. 11. FIG. 11 is a flowchart representative of an example method 1100 that may be performed by the FWT control modules 158,160 of FIGS. 2A and 2B to validate an outgoing electronic command from the FWT controller 258, and, more generally, the FWT control modules 158,160. The example method 1100 begins at block 1102 when the FWT control modules 158, 160 obtain the command. For example, the command interceptor 282 may obtain the command by intercepting the command from the FWT controller 258.

At block 1104, the FWT control modules 158,160 determine whether the command violates an FWT apparatus rule. For example, the FWT apparatus analyzer 284 may determine whether the command violates one or more FWT apparatus rules. If, at block 1104, the FWT control modules 158,160 determine that the command violates the one or more FWT apparatus rules, then, at block 1106, the FWT control modules 158,160 modify the command with a stored command. For example, the safety interlocker 290 may replace the command (e.g., the value of the command) with the stored command obtained from the database 270. If, at block 1104, the FWT control modules 158,160 determine that the command does not violate the one or more FWT apparatus rules, then, at block 1108, the FWT control modules 158,160 determine whether the command violates a flight stage rule. For example, the flight stage analyzer 286 may determine whether the command violates one or more flight stage rules. If, at block 1108, the FWT control modules 158,160 determine that the command violates the one or more flight stage rules, then, at block 1110, the FWT control modules 158,160 cancel the command. For example, the safety interlocker 290 may cancel the command by discarding or dropping the command. In another example, the safety interlocker 290 may replace the command with a zero value, a null index, a null character, etc. If, at block 1108, the FWT control modules 158,160 determine that the command does not violate the one or more flight stage rules, then the example method 1100 concludes.

Figure 12:
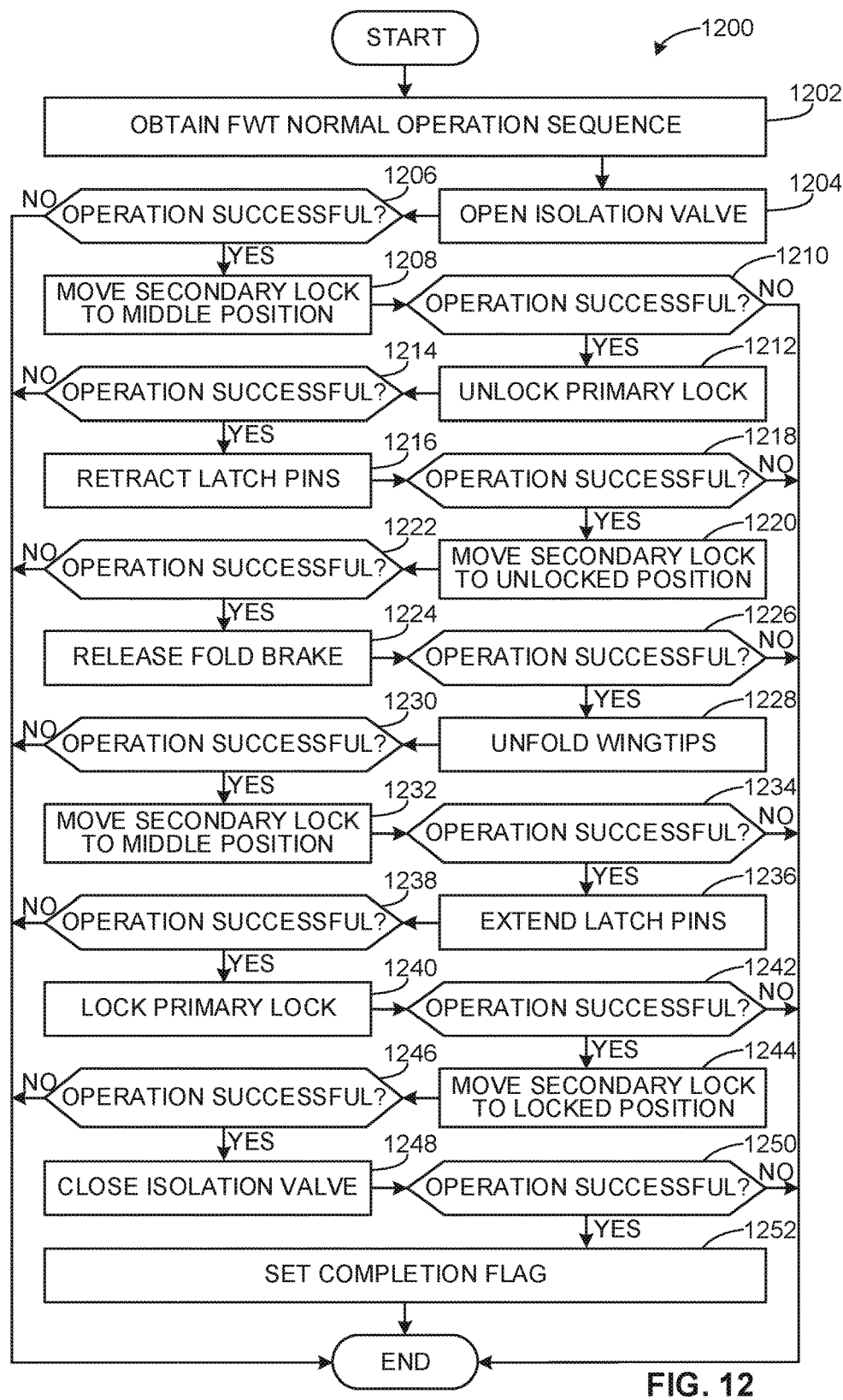

Additional detail in connection with executing an example unfolding operation sequence (FIG. 8 block 806) is shown in FIG. 12. FIG. 12 is a flowchart representative of an example method 1200 that may be performed by the FWT control modules 158,160 of FIGS. 2A and 2B to execute the example unfolding operation sequence of the FWT apparatus 154,156 of FIG. 1. The example method 1200 begins at block 1202 when the FWT control modules 158,160 obtain an FWT normal operation sequence. For example, the FWT normal operation sequencer 252 may determine the FWT normal operation sequence. The FWT normal operation sequencer 252 may store the FWT normal operation sequence in the database 270. The FWT controller 258 may obtain the FWT normal operation sequence from the FWT normal operation sequencer 252 or from the database 270. At block 1204 the FWT control modules 158,160 open an isolation valve (e.g., a hydraulic valve, a pneumatic valve, etc.). For example, the FWT controller 258 may issue a command to the REU 168 of FIG. 1 via the command transmitter 292 to open the isolation valve of the FWT apparatus 154. At block 1206, the FWT control modules 158,160 determine whether the operation is successful. For example, the FWT controller 258 may determine whether the operation is successful based on a status change of the isolation valve. If, at block 1206, the FWT control modules 158,160 determine that the operation is successful, then, at block 1208, the FWT control modules 158,160 move a secondary lock to a middle position, otherwise the example method 1200 concludes.

At block 1208, the FWT control modules 158,160 move the secondary lock to the middle position or an intermediate position. For example, the FWT controller 258 may issue a command to the REU 168 via the command transmitter 292 to move the secondary lock of the FWT apparatus 154 to the middle position. At block 1210, the FWT control modules 158,160 determine whether the operation is successful. For example, the FWT controller 258 may determine whether the operation is successful based on a status change of the secondary lock. If, at block 1210, the FWT control modules 158,160 determine that the operation is successful, then, at block 1212, the FWT control modules 158,160 unlock a primary lock, otherwise the example method 1200 concludes.

At block 1212, the FWT control modules 158,160 unlock the primary lock. For example, the FWT controller 258 may issue a command to the REU 168 via the command transmitter 292 to unlock the primary lock of the FWT apparatus 154. At block 1214, the FWT control modules 158,160 determine whether the operation is successful. For example, the FWT controller 258 may determine whether the operation is successful based on a status change of the primary lock. If, at block 1214, the FWT control modules 158,160 determine that the operation is successful, then, at block 1216, the FWT control modules 158,160 retract latch pins, otherwise the example method 1200 concludes.

At block 1216, the FWT control modules 158,160 retract the latch pins. For example, the FWT controller 258 may issue a command to the REU 168 via the command transmitter 292 to retract the latch pins of the FWT apparatus 154. At block 1218, the FWT control modules 158,160 determine whether the operation is successful. For example, the FWT controller 258 may determine whether the operation is successful based on a status change of the latch pins. If, at block 1218, the FWT control modules 158,160 determine that the operation is successful, then, at block 1220, the FWT control modules 158,160 move the secondary lock to an unlocked position, otherwise the example method 1200 concludes.

At block 1220, the FWT control modules 158,160 move the secondary lock to the unlocked position. For example, the FWT controller 258 may issue a command to the REU 168 via the command transmitter 292 to move the secondary lock of the FWT apparatus 154 to the unlocked position. At block 1222, the FWT control modules 158,160 determine whether the operation is successful. For example, the FWT controller 258 may determine whether the operation is successful based on the status change of the secondary lock. If, at block 1222, the FWT control modules 158,160 determine that the operation is successful, then, at block 1224, the FWT control modules 158,160 engage a fold brake, otherwise the example method 1200 concludes.

At block 1224, the FWT control modules 158,160 engage the fold brake. For example, the FWT controller 258 may issue a command to the REU 168 via the command transmitter 292 to engage the fold brake of the FWT apparatus 154. At block 1226, the FWT control modules 158,160 determine whether the operation is successful. For example, the FWT controller 258 may determine whether the operation is successful based on a status change of the fold brake. If, at block 1226, the FWT control modules 158,160 determine that the operation is successful, then, at block 1228 the FWT control modules 158,160 unfold the wingtips, otherwise the example method 1200 concludes.

At block 1228, the FWT control modules 158,160 unfold the wingtips. For example, the FWT controller 258 may issue a command to the REU 168 via the command transmitter 292 to move the moveable surface 134 of the FWT apparatus 154 from the folded position 146 to the extended position 142. At block 1230, the FWT control modules 158,160 determine whether the operation is successful. For example, the FWT controller 258 may determine whether the operation is successful based on a status change of the folding wingtips. If, at block 1230, the FWT control modules 158,160 determine that the operation is successful, then, at block 1232 the FWT control modules 158,160 move the secondary lock to the middle position, otherwise the example method 1200 concludes.

At block 1232, the FWT control modules 158,160 move the secondary lock to the middle position or the intermediate position. For example, the FWT controller 258 may issue a command to the REU 168 via the command transmitter 292 to move the secondary lock of the FWT apparatus 154 from the unlocked position to the middle position. At block 1234, the FWT control modules 158,160 determine whether the operation is successful. For example, the FWT controller 258 may determine whether the operation is successful based on the status change of the secondary lock. If, at block 1234, the FWT control modules 158,160 determine that the operation is successful, then, at block 1236 the FWT control modules 158,160 extend the latch pins, otherwise the example method 1200 concludes.

At block 1236, the FWT control modules 158,160 extend the latch pins. For example, the FWT controller 258 may issue a command to the REU 168 via the command transmitter 292 to extend the latch pins of the FWT apparatus 154. At block 1238, the FWT control modules 158,160 determine whether the operation is successful. For example, the FWT controller 258 may determine whether the operation is successful based on the status change of the latch pins. If, at block 1238, the FWT control modules 158,160 determine that the operation is successful, then, at block 1240 the FWT control modules 158,160 lock the primary lock, otherwise the example method 1200 concludes.

At block 1240, the FWT control modules 158,160 lock the primary lock. For example, the FWT controller 258 may issue a command to the REU 168 via the command transmitter 292 to move the primary lock of the FWT apparatus 154 from the unlocked position to the locked position. At block 1242, the FWT control modules 158,160 determine whether the operation is successful. For example, the FWT controller 258 may determine whether the operation is successful based on the status change of the primary lock. If, at block 1242, the FWT control modules 158,160 determine that the operation is successful, then, at block 1244 the FWT control modules 158,160 move the secondary lock to the locked position, otherwise the example method 1200 concludes.

At block 1244, the FWT control modules move the secondary lock to the locked position. For example, the FWT controller 258 may issue a command to the REU 168 via the command transmitter 292 to move the secondary lock of the FWT apparatus 154 from the middle position to the locked position. At block 1246, the FWT control modules 158,160 determine whether the operation is successful. For example, the FWT controller 258 may determine whether the operation is successful based on the status change of the secondary lock. If, at block 1246, the FWT control modules 158,160 determine that the operation is successful, then, at block 1248 the FWT control modules 158,160 close the isolation valve, otherwise the example method 1200 concludes.

At block 1248, the FWT control modules 158,160 close the isolation valve. For example, the FWT controller 258 may issue a command to the REU 168 via the command transmitter 292 to close the isolation valve of the FWT apparatus 154. At block 1250, the FWT control modules 158,160 determine whether the operation is successful. For example, the FWT controller 258 may determine whether the operation is successful based on the status change of the isolation valve. If, at block 1250, the FWT control modules 158,160 determine that the operation is successful, then, at block 1252 the FWT control modules 158,160 set a completion flag, otherwise the example method 1200 concludes.

The above-described methods of FIGS. 3-12 may be applicable to the FWT control module 158, the FWT control module 160, and/or a combination thereof. In some examples, the above-described methods of FIGS. 3-12 are applicable to one or more FWT control modules. For example, the above-described methods of FIGS. 3-12 may be applicable to the FWT control module 158, the FWT control module 160, a third FWT control module, etc. and/or a combination thereof.

Figure 13:
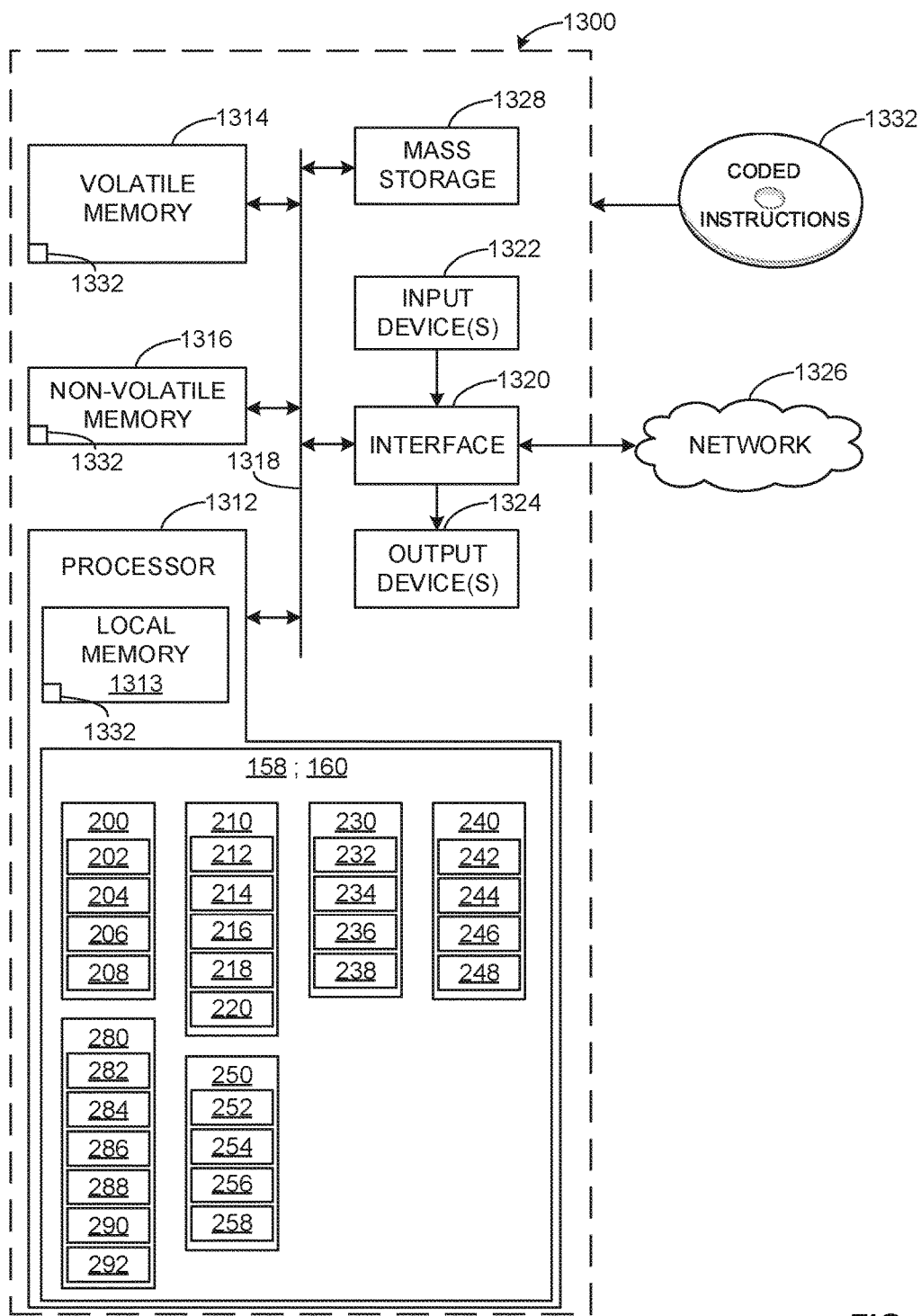
FIG. 13 is a block diagram of an example processing platform structured to execute machine-readable instructions to implement the methods of FIGS. 3-12 and the example folding wingtip control module apparatus of FIGS. 2A and 2B.

FIG. 13 is a block diagram of an example processor platform 1300 capable of executing instructions to implement the methods of FIGS. 3-12 and the apparatus of FIGS. 2A and 2B. The processor platform 1300 can be, for example, a server, an industrial computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example FWT control modules 158,160. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314,1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326

(e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The example mass storage 1328 implements the example database 270.

Coded instructions 1332 to implement the methods of FIGS. 3-12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed folding wingtip control module and methods obtain status information corresponding to the above disclosed folding wingtip apparatus and, more generally, an aircraft process control system. As a result, the above disclosed folding wingtip control module and methods generate a sequence of stages and events to be executed in succession to automatically fold and extend the above disclosed folding wingtip apparatus based on the obtained status information. The sequence of stages and events are executed based on a command validated by the above disclosed folding wingtip control module.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a detection module to:
        determine a status of a component of a folding wingtip assembly operatively coupled to a wing of an aircraft via a sensor, the status including at least one of the component in an extended position, a folded position, or an intermediate position; and
        determine a flight stage of the aircraft;
    a sequence and control module to generate a first command to control a movement of the folding wingtip assembly; and
    a gatekeeper module to:
        validate the first command based on at least one of the status or the flight stage by:
            replacing the first command with a second command when the first command violates a folding wingtip rule based on the status, the second command to control the movement of the folding wingtip assembly; and
            validating the first command to be used to control the movement when the first command does not violate the folding wingtip rule; and
        control the movement of the folding wingtip assembly based on the first command or the second command.

2. The apparatus of claim 1, wherein the status is an operational status of the component.

3. The apparatus of claim 1, wherein the flight stage includes whether the aircraft is in flight or in motion on a ground surface.

4. The apparatus of claim 1, wherein the gatekeeper module includes:
    a flight stage analyzer to generate a flight stage rule based on the flight stage; and
    a safety interlocker to:
        replace the first command with the second command when the first command violates the flight stage rule; and
        validate the first command to be used to control the movement when the first command does not violate the folding wingtip rule and the flight stage rule.

5. The apparatus of claim 1, wherein the status is a first status and the component is a first component, and further including a monitor and annunciation module to:
    determine if the first status is valid;
    identify if there is a second component that is redundant to the first component when the first status is not valid; and
    replace the first status with a second status when the second component is identified, the second status corresponding to the second component.

6. The apparatus of claim 5, wherein the gatekeeper module is to validate the first command based on the flight stage and either of the first status or the second status, a use of either the first status or the second status is based on whether the first status is valid.

7. A method, comprising:
    determining a status of a component of a folding wingtip assembly operatively coupled to a wing of an aircraft via a sensor, the status including at least one of the component in an extended position, a folded position, or an intermediate position;
    determining a flight stage of the aircraft;
    generating a first command to control a movement of the folding wingtip assembly;
    validating, by executing an instruction with a processor, the first command based on at least one of the status or the flight stage by:
        replacing the first command with a second command when the first command violates a folding wingtip rule based on the status, the second command to control the movement of the folding wingtip assembly; and
        validating the first command to be used to control the movement when the first command does not violate the folding wingtip rule; and
    controlling the movement of the folding wingtip assembly based on the first command or the second command.

8. The method of claim 7, wherein the status is an operational status of the component.

9. The method of claim 7, wherein the flight stage includes whether the aircraft is in flight or in motion on a ground surface.

10. The method of claim 7, wherein validating the first command includes:
    generating a flight stage rule based on the flight stage;
    replacing the first command with the second command when the first command violates the flight stage rule; and
    validating the first command to be used to control the movement when the first command does not violate the folding wingtip rule and the flight stage rule.

11. The method of claim 10, further including dropping the first command when the first command violates at least one of the folding wingtip rule or the flight stage rule.

12. The method of claim 7, wherein the status is a first status and the component is a first component, and further including:

determining if the first status is valid;

identifying if there is a second component that is redundant to the first component when the first status is not valid; and replacing the first status with a second status when the second component is identified, the second status corresponding to the second component.

13. The method of claim 12, wherein validating the first command is based on the flight stage and either of the first status or the second status, a use of either the first status or the second status is based on whether the first status is valid.

14. A non-transitory computer readable storage medium comprising instructions which, when executed, cause a machine to at least:

determine a status of a component of a folding wingtip assembly operatively coupled to a wing of an aircraft via a sensor, the status including at least one of the component in an extended position, a folded position, or an intermediate position;

determine a flight stage of the aircraft;

generate a first command to control a movement of the folding wingtip assembly;

validate the first command based on at least one of the status or the flight stage by:

replacing the first command with a second command when the first command violates a folding wingtip rule based on the status, the second command to control the movement of the folding wingtip assembly; and validating the first command to be used to control the movement when the first command does not violate the folding wingtip rule; and control the movement of the folding wingtip assembly based on the first command or the second command.

15. The non-transitory computer readable storage medium of claim 14, wherein the status is an operational status of the component.

16. The non-transitory computer readable storage medium of claim 14, wherein the flight stage includes whether the aircraft is in flight or in motion on a ground surface.

17. The non-transitory computer readable storage medium of claim 14, wherein the instructions, when executed, cause the machine to valdiate the first command by:

generating a flight stage rule based on the flight stage;

replacing the first command with the second command when the first command violates the flight stage rule; and validating the first command to be used to control the movement when the first command does not violate the folding wingtip rule and the flight stage rule.

18. The non-transitory computer readable storage medium of claim 17, wherein the instructions, when executed, cause the machine to drop the first command when the first command violates at least one of the status folding wingtip rule or the flight stage rule.

19. The non-transitory computer readable storage medium of claim 14, wherein the status is a first status and the component is a first component, and wherein the instructions, when executed, cause the machine to at least:

determine if the first status is valid;

identify if there is a second component that is redundant to the first component when the first status is not valid; and replace the first status with a second status when the second component is identified, the second status corresponding to the second component.

20. The non-transitory computer readable storage medium of claim 19, wherein the instructions, when executed, cause the machine to validate the first command based on the flight stage and either of the first status or the second status, a use of either the first status or the second status is based on whether the first status is valid.

* * * * *